US011165711B2

(12) United States Patent
Mehrvar et al.

(10) Patent No.: US 11,165,711 B2
(45) Date of Patent: Nov. 2, 2021

(54) METHODS AND APPARATUSES FOR TRANSPARENT EMBEDDING OF PHOTONIC SWITCHING INTO ELECTRONIC CHASSIS FOR SCALING DATA CENTER CLOUD SYSTEM

(71) Applicants: Hamid Mehrvar, Ottawa (CA); Dominic John Goodwill, Ottawa (CA); Yong Luo, San Jose, CA (US)

(72) Inventors: Hamid Mehrvar, Ottawa (CA); Dominic John Goodwill, Ottawa (CA); Yong Luo, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 16/687,283

(22) Filed: Nov. 18, 2019

(65) Prior Publication Data
US 2020/0351216 A1 Nov. 5, 2020

Related U.S. Application Data
(60) Provisional application No. 62/840,988, filed on Apr. 30, 2019.

(51) Int. Cl.
H04L 12/863 (2013.01)
H04J 14/02 (2006.01)
(52) U.S. Cl.
CPC .......... H04L 47/50 (2013.01); H04J 14/0221 (2013.01)
(58) Field of Classification Search
CPC ......... H04L 47/50; H04J 14/0221; H01J 9/02; H01L 33/40
See application file for complete search history.

(56) References Cited

U.S. PATENT DOCUMENTS

2016/0047991 A1  2/2016 Mehrvar
2016/0337723 A1* 11/2016 Graves ............... H04Q 11/0003
(Continued)

FOREIGN PATENT DOCUMENTS

| CN | 106134116 A | 11/2016 |
| CN | 108369333 A | 8/2018 |
| WO | 2015060820 A1 | 4/2015 |

OTHER PUBLICATIONS

Hamid Mehryar et al "40Gb/s Pure Photonic Packet Switch for Datacenters"; OFC 2015.
(Continued)

Primary Examiner — Iqbal Zaidi

(57) ABSTRACT

There is provided methods and apparatuses for transferring photonic cells or frames between a photonic switch and an electronic switch enabling a scalable data center cloud system with photonic functions transparently embedded into an electronic chassis. In various embodiments, photonic interface functions may be transparently embedded into existing switch chips (or switch cards) without changes in the line cards. The embedded photonic interface functions may provide the switch cards with the ability to interface with both existing line cards and photonic switches. In order to embed photonic interface functions without changes on the existing line cards, embodiments use two-tier buffering with a pause signalling or pause messaging scheme for managing the two-tier buffer memories.

19 Claims, 18 Drawing Sheets

(56) References Cited

U.S. PATENT DOCUMENTS

2018/0359194 A1* 12/2018 Yang .................... H04B 10/801
2020/0037055 A1* 1/2020 Kucharewski ..... H04Q 11/0005

OTHER PUBLICATIONS

Hamid Mehrvar et al "Scalable Photonic Packet Switch Test-bed for Datacenters"; OFC 2016.
Hamid Mehrvar et al "Fast Photonic Switch Architecture for Interconnect Applications"; European Conference on Optical Communications, 2018, paper Th2.45.
Hamid Mehrvar et al "Scalable Architecture and Low-Latency Scheduling Schemes for Next Generation Photonic Datacenters"; IEEE ICC 2016—Optical Networks and Systems.

* cited by examiner

METHODS AND APPARATUSES FOR TRANSPARENT EMBEDDING OF PHOTONIC SWITCHING INTO ELECTRONIC CHASSIS FOR SCALING DATA CENTER CLOUD SYSTEM

CROSS REFERENCE TO RELATED APPLICATIONS

This application claims the benefit of priority to U.S. Patent Application Ser. No. 62/840,988 entitled "Methods and Apparatuses for Transparent Embedding of Photonic Switching into Electronic Chassis for Scaling Data Center Cloud System" filed Apr. 30, 2019, which is hereby incorporated by reference in its entirety.

FIELD OF THE INVENTION

The present invention pertains to the field of communications and in particular to methods and apparatuses for transferring photonic cells or frames between a photonic switch and an electronic switch, which can provide a scalable data center cloud system with photonic functions transparently embedded into an electronic chassis.

BACKGROUND

Exponential growth in the volume of data and data transmissions at data centers has provided motivation for research into and use of photonic switches which may provide high switching capacity, low energy consumption, and a small footprint. However, there exist several factors that discourage many technology enterprises, telecommunications equipment manufacturers or network service providers from investing in or planning deployment of photonic switches.

One such discouraging factor is financial cost. Conventionally, use of photonic switches at data centers requires photonic related functions and photonic fabric interfaces. Photonic related functions and photonic fabric interfaces require new line cards as existing line cards do not support photonic functions. Moreover, even if the existing line cards are changed or modified, those modified line cards may not be able to support at least some of the photonic related functions. As such, new line cards that can interface and communicate with photonic switches need to be deployed for such an enhanced data center network. However, replacing existing line cards with new line cards is perceived as a loss of investment by both network equipment manufacturers and network service providers because many manufacturers and service providers already possess a large number of network line cards in several generations. Furthermore, most of these network line cards have many years of life expectancy remaining.

Currently, there is no photonic switch or architecture for a photonic switch which can provide a high switching capacity, a low energy consumption, and a small footprint, while not requiring replacement of currently deployed network line cards, thereby substantially maximizing returns of the investment made on such network line cards.

Therefore, there is a need for a method and apparatus for transparently embedding photonic switching into electronic chassis for scalable data center cloud system, that is not subject to one or more limitations of the prior art, for example requirement of changing currently deployed network line cards.

This background information is provided to reveal information believed by the applicant to be of possible relevance to the present invention. No admission is necessarily intended, nor should be construed, that any of the preceding information constitutes prior art against the present invention.

SUMMARY

An object of embodiments there is provided methods and apparatuses for transferring photonic cells, packet or frames between a photonic switch and an electronic switch, which can provide a scalable data center cloud system with photonic functions transparently embedded into an electronic chassis. In accordance with embodiments, there is provided an electronic switch card communicatively interfacing with one or more photonic switches. The electronic switch card includes a cell switch communicatively connected to one or more line cards, wherein each of the one or more line cards includes one or more main queues. The cell switch may be configured to perform cell or packet switching at one end interfacing the line cards. The electronic switch card further includes an electronic switch chip integrating one or more photonic functions. The electronic switch chip is communicatively coupled to the cell switch at a first end and communicatively coupled to one or more photonic switches at a second end. The electronic switch chip may be configured to perform both photonic functions and cell/packet switching functions in order to direct photonic cells or frames to the allocated interface connected to the photonic switch.

In some embodiments, the electronic switch chip includes one or more per destination chassis buffers, one or more switch buffers and an electronic switch controller. The electronic switch controller is configured to send control signals to the one or more line cards. The electronic switch controller may be further configured to send control signals to a photonic controller. The electronic switch controller is communicatively connected with the one or more per destination chassis buffers and the one or more switch buffers.

In some embodiments, the electronic switch controller is configured to send a pause signal to the one or more line cards upon determination that one or more of the destination chassis buffers and switch buffers meets or exceeds a threshold. In some embodiments, the electronic switch controller is further configured to send control signals to a photonic switch controller, either directly or indirectly through chassis control cards (e.g. CCC control cards).

In accordance with embodiments, there is provided a cluster central chassis (CCC) controller configured to control one or more photonic switches. The CCC controller includes an interface for receiving data (e.g. control data) from and transmitting data (e.g. control data) to one or more electronic switch controllers. The CCC controller includes one or more processors and a machine readable memory for storing instructions. The instructions when executed by the one or more processors cause the CCC controller to be configured to receive a buffer report including one or more of a pause signalling rate and a buffer-depth. The pause signalling rate indicates pause signal transmission frequency and the buffer-depth indicates space availability in the one or more per destination chassis buffers designated for a destination. The instructions when executed by the one or more processors further cause the CCC controller to be configured to allocate one or more bandwidths and one or more interfaces at least partly based on the buffer report, to the one or more per destination chassis buffers.

In accordance with embodiments, there is provided a method for controlling photonic cell, packet or frame transfer using one or more electronic switch cards and one or more photonic switches. The method includes sending a buffer report including one or more of a pause signalling rate and a buffer-depth. The pause signalling rate indicates pause signal transmission frequency and the buffer-depth indicates space availability in the one or more per destination chassis buffers designated for a destination. The buffer-depth may indicate space availability in one or more per destination chassis buffers designated for a destination information in the electronic switch card communicatively connected to the photonic controller. The method further includes sending a pause signal from the one or more electronic switch cards to one or more line cards communicatively connected to the one or more electronic switch cards when the one or more per destination chassis buffers reaches a threshold.

In accordance with embodiments, there is provided a method for photonic cell, packet or frame transfer using one or more electronic switch cards and one or more photonic switches. The method includes scheduling the photonic cell transfer for one or more time slots and upon the scheduling, the method further includes allocating one or more bandwidths and one or more interfaces, at least partly based upon one or more of a pause signalling rate and a buffer-depth. The pause signalling rate indicates pause signal transmission frequency and the buffer-depth indicates space availability in one or more per destination chassis buffers designated for a destination. The pause signal may be transmitted from one or more electronic switch cards to one or more line cards. The method further includes determining a path for the photonic cell transfer, configuring the one or more photonic switches for scheduled transfer of the photonic cell and sending the photonic cell to the one or more photonic switches allocated via the one or more interfaces.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
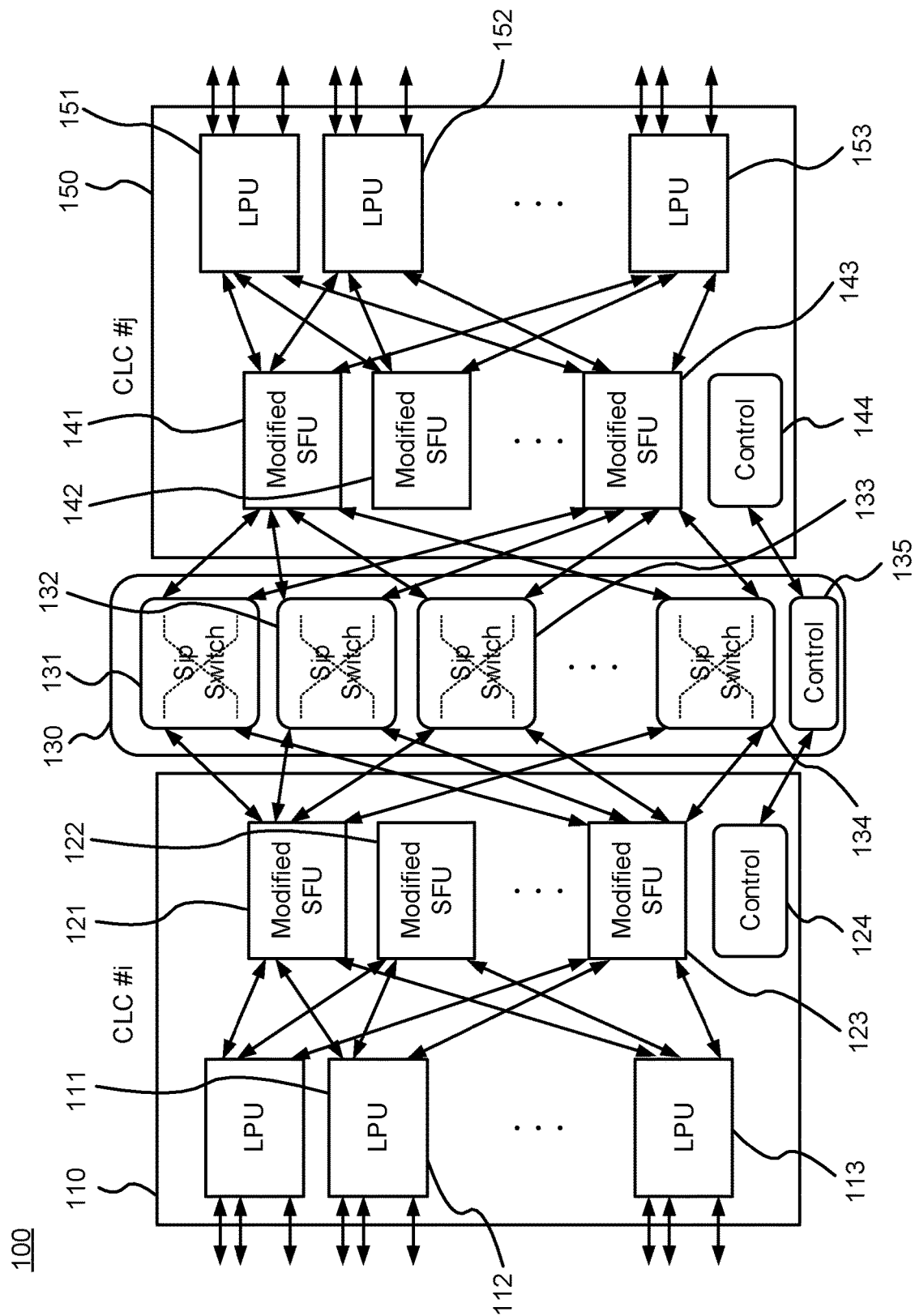
FIG. 1A illustrates an example architecture of the scalable data center system using photonic switches, modified electronic switch cards and modified control cards, in accordance with embodiments.

Unless defined otherwise, all technical and scientific terms used herein have the same meaning as commonly understood by one of ordinary skill in the art to which this invention belongs.

Unless defined otherwise, cell may refer to a data unit which includes cell, packet and frame, and the photonic cell or photonic frame may include cells, data packets and data frame. In this application, cell, packet and frame may be interchangeably used.

There is provided methods and apparatuses for transferring photonic cells, packet or frames between a photonic switch and an electronic switch in a scalable data center cloud system wherein photonic functions are transparently embedded into the electronic chassis.

Today's packet scaling is based upon cluster line chassis (CLC) and cluster central chassis (CCC). Currently, both CLCs and CCCs use electronic (packet) switches with transceivers, whether as a form of plug-in or on-board chip. Every electronic (packet) switch may be communicatively connected to the transceivers. Scalability of a data center can be improved, for example up to multi-petabit per second, upon replacing an electronic core CCC with a photonic CCC comprising an array of photonic switches (e.g. silicon photonics (SiP) switches).

Embodiments improve scalability of an existing data center system by replacing electronic core CCCs with photonic CCCs comprising an array of photonic switches (e.g. SiP switches). Since the array of photonic switches requires use of photonic functions, the electronic switch cards need to integrate photonic functions in order to operatively communicate with the photonic CCC. However, photonic related functions and photonic fabric interfaces require that line cards are compatible with photonic functions. As noted above, replacing existing line cards with new line cards is widely perceived as loss of investment. As such, integration of the photonic functions into the switch card, for example a switch card with many high-speed transceivers (e.g. 8-12 transceivers, 800 G), without replacing existing line card is desired. Restricting conditions for this implementation can include:

- Photonic functions require some chip area (e.g. physical area on the chip) and buffering spaces.
- On-chip buffering is required as off-chip buffering is not feasible due to its slow speed (e.g. latency) and the potential limitation of physical space on the switch card (e.g. board real estate).
- Size of the on-chip buffering memories is limited.
- Line cards cannot be changed to include at least some of the photonic functions.

According to embodiments, the above restrictions can be overcome by using a two-tier buffering space and pause signalling or pause messaging scheme between the two-tier buffer memories (e.g. sending a pause signal by the switch to the line cards). The two-tier buffer may be implemented using a memory in the line card (e.g. Line Processing Unit (LPU)) and another memory in the electronic switch card (e.g. Switch Fabric Unit (SFU)) interfacing with the photonic switch. Moreover, in various embodiments, the existing control (or control-path) function may be enhanced to facilitate the use of photonic or photonic related functions.

According to embodiments, in some use cases, the buffers in the switch card (e.g. SFU) may only support one class buffering. In such cases, the main queue in the line card (e.g. LPU) may have deep queues and handle all priorities; hence there may be no need for the buffers in the switch card (e.g. SFU) to support per-class queuing (e.g. multi-class support), multicasting or priority handling. In this case, the buffer(s) in the electronic switch may have a small capacity. For example, a buffer in the electronic switch card (e.g. SFU) may be able to hold a few frames of traffic, which is representative of a few micro-seconds in time, to be scheduled through the photonic fabric. In some other use cases, the buffers in the switch card (e.g. SFU) may support per-class queuing (e.g. multi-class support), multicasting or priority handling.

According to embodiments, the (pause) signalling/message scheme between the two memories (e.g. a buffer or a queue in the line card (e.g. LPU) and another buffer or queue in the electronic switch card) may be supported by current line cards. The pause signal may be sent from the switch chip (or switch card) to the line cards. The pause signal may be put into the buffer in the electronic switch card to be sent to the line cards when the buffer in the electronic switch card reaches a threshold. The pause signal in the switch buffer may be removed when usage of the buffer (e.g. the buffer in the electronic switch card) goes below the threshold. In some embodiments, same threshold may be used for addition and removal of the pause signal. In some embodiment, different thresholds may be used for addition and removal of the pause signal. The (pause) signalling/message scheme of the switch card (e.g. SFU) sends a pause signal to the line cards.

According to embodiments, photonic (interface) functions may be integrated into the same space where the electronic switch card is placed in the chassis so that the existing line cards can be used without changes therein (e.g. there is essentially no impact on existing functions in the line card). The photonic (interface) functions may be transparently embedded into existing switch chips (or switch cards) so that the switch cards can interface with both existing line cards and photonic switches. In other words, the transparently embedded photonic functions in the existing electronic switch chips (or switch cards) may allow one side of the electronic switch to communicate with the line cards and provide electronic switching between the line cards of chassis (e.g. CLC). The transparently embedded photonic functions in the existing electronic switch chips (or switch cards) may also allow the other side of the electronic switch to communicate with the photonic switches. The electronic switch card may include several high-speed transceivers to interface with another chassis through photonic switches.

According to embodiments, the photonic switching system can have three stages. The first and third stages of the switching system may be part of an access switch with photonic interfaces, and the middle stage or second stage of the switching system may be a photonic switch.

According to embodiments, the embedded photonic functions may be part of a common equipment chassis (e.g. the photonic switching and the required changes may be part of a common equipment chassis). The embedded photonic functions may allow transparent integration of a photonic core switch into the electronic switch enabling possible scalability greater than one petabit per second. It should be noted that when photonic switches are at the core, a large number of transceivers can be eliminated thereby lowering manufacturing cost. It should also be noted that the photonic switching system may achieve one or more other benefits, such as multi-petabit scaling, small footprint, low power consumption, and a possible cooling effect.

The embedded functions may be data-path functions and control (or control-path) functions. In some embodiments, the control-path functions and data-path functions may be embedded into electronic switch for a single-plane photonic fabric. In some embodiments, the control-path functions and data-path functions may be embedded into the electronic switch for a multi-plane photonic fabric. The data-path functions may be embedded into the data-path of the electronic switch (e.g. first and third stages of photonic switching system). The data-path functions may include photonic framing and de-framing functions (e.g. function(s) for wrapping electronic cells in a photonic cell and function(s) for un-wrapping the photonic cell) and function(s) for de-queuing data packets of one or many time-slots from one or more buffers where the data packets may be sent in one time slot. The control-path functions may be embedded into the control cards of the common equipment cards (e.g. management cards). The control-path functions may include function(s) for sending pause signaling to the line cards from the switch cards, function(s) for reporting the pause-rate and buffer-depth to a core controller of the photonic switch for bandwidth allocation, function(s) for synchronization, and function(s) for scheduling photonic cells. The control-path function(s) may further include function(s) for processing the grants from the controller, can be important for multi-interface allocation to a single buffer in a single time slot. In some embodiments, the control-path functions may be performed via messages from the electronic switch controller (or CLC controller). The electronic switch controller (or CLC controller) may have two sets of messages, one for the line cards and one for the photonic switch controller. In the case where the message is for the line card, the message may be sent to the line card through a backplane. In the case where the message is for the photonic switch controller, the message may be sent to the electronic switch controller (or CLC controller) via the backplane first, and subsequently the message may be sent to the photonic switch controller through dedicated fibre connections between CLC controller and photonic switch controller.

According to embodiments, with intelligent electronic control and efficient scheduling algorithms, the latency (e.g. delay performance) of the photonic switches may be comparable to the latency of electronic switches, while power and scaling benefits of the photonic switches can outweigh those of the electronic switches.

FIG. 1A illustrates an example architecture of a scalable data center system using photonic switches, modified electronic switch cards (e.g. SFU) and modified control cards, in accordance with embodiments. FIG. 1A illustrates a photonic core chassis communicatively connected to a chassis including line cards or line processing units (LPUs), which form a cluster line chassis (CLC).

According to embodiments, the line cards illustrated in FIG. 1A may equate to existing line cards. The existing line cards may be used in the photonic switch architecture without any changes or modifications thereon. In other words, the line cards may remain intact. On the other hand, the electronic switch card contained in the CLC (e.g. the switch fabric units (SFU)) may be modified to operatively communicate with the photonic core chassis. The controller for such modified switch cards (e.g. the electronic switch controller or CLC controller), which is also contained in the CLC, may be accordingly modified.

According to embodiments, the photonic core chassis may correspond to the chassis that is generally known as cluster central chassis (CCC) in many of present electronic products. Accordingly, it is to be understood that the terms photonic core chassis and CCC (or photonic CCC) will be used interchangeably. However, the photonic core chassis is not equivalent to the existing CCC as the photonic CCC includes new hardware components. Specifically, the photonic switches contained in the photonic core chassis are new hardware components (e.g. SiP switches). Moreover, the controller for the new photonic switches, which is also contained in the photonic CCC, is also a new hardware component (e.g. SiP switch controller).

Referring to FIG. 1A, the architecture 100 may include the CLC 110, cluster central chassis (CCC) 130 and CLC 150. The CLC 110 may include a plurality of line processing units (LPUs), such as the LPUs 111, 112, 113, a plurality of modified switch fabric units (SFUs), such as the SFUs 121, 122, 123, and a component that controls the SFUs, such as the CLC controller 124. Similarly, the CLC 150 may include a plurality of LPUs, such as the LPUs 151, 152, 153, a plurality of modified switch fabric units (SFUs), such as the SFUs 141, 142, 143, and a component that controls the SFUs, such as the CLC controller 144. The CCC 130 may include a plurality of silicon photonic switches (SiP switches), such as the SiP switches 131, 132, 133, 134, and a component that controls the photonic switches, such as the photonic switch controller 135.

Further referring to FIG. 1A, each SiP switch contained in the CCC 130 may be communicatively connected to each modified SFU contained in the CLC 110 and the CLC 150. For example, the SiP switch 131 may be communicatively connected to each of the SFUs 121, 122, 123, 141, 142, 143 and other SFUs contained in the CLC 110 and the CLC 150. Similarly, the SiP switches 132, 133 and 134 may be communicatively connected to each of the SFUs 121, 122, 123, 141, 142, 143 and other SFUs contained in the CLC 110 and the CLC 150.

Further referring to FIG. 1A, each modified SFU switch contained in the CLC 110 may be communicatively connected to each LPU contained in the CLC 110. For example, each of the SFUs 121, 122, 123 may be communicatively connected to each of the LPUs 111, 112, 113 and other LPUs contained in the CLC 110. Similarly, each modified SFUs switch contained in the CLC 150 may be communicatively connected to each LPU contained in the CLC 150. For example, each of the SFUs 141, 142, 143 may be communicatively connected to each of the LPUs 151, 152, 153 and other LPUs contained in the CLC 150.

According to embodiments, while not explicitly illustrated in FIG. 1A, each LPU contained in the CLC 110 and the CLC 150 may interface with a telecommunications access network. CLC 110 and the CLC 150 may be communicatively connected to one or more network elements such as servers, or interfaces with a telecommunications access network, and communicatively connected to one or more network elements such as servers.

Further referring to FIG. 1A, the photonic switch controller 135 contained in the CCC 130 may be communicatively connected to the CLC controller 124 in the CLC 110 and the CLC controller 144 in the CLC 140.

As mentioned above, LPUs or line cards contained in the CLC may not need to be changed or modified for communication between the CLC and the CCC therefore the existing LPUs may remain intact. Accordingly, existing line cards that many network service providers possess can be used without any modification. This configuration may provide considerable cost savings in implementation.

Figure 1B:
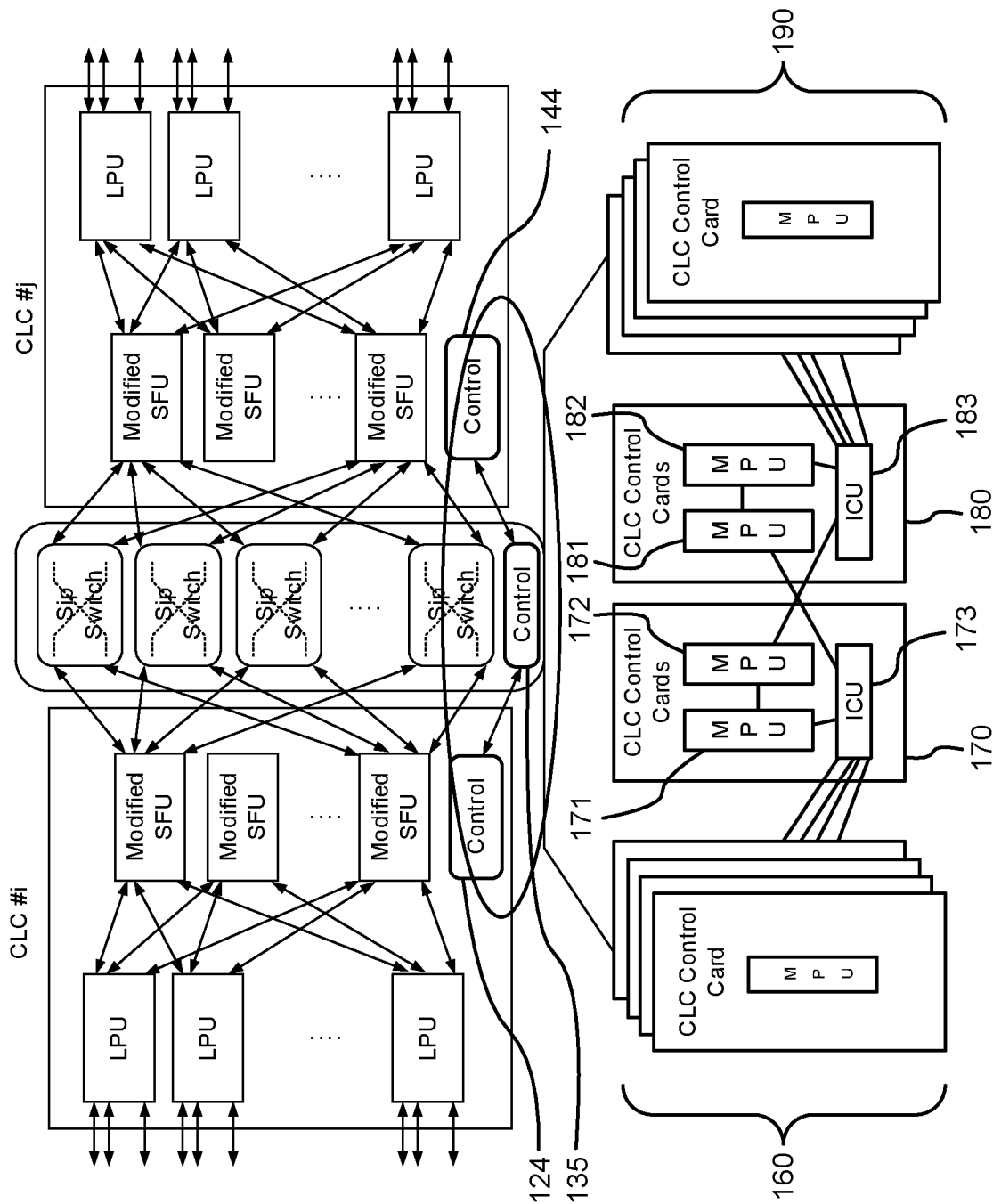
FIG. 1B illustrates an example architecture of CLC control cards and CCC control cards, in accordance with embodiments.

FIG. 1B illustrates an example architecture of CLC control cards and CCC control cards, in accordance with embodiments. Referring to FIG. 1B, the CLC controller 124 and the CLC controller 144 are represented by the CLC control card group 160 and the CLC control card group 190, respectively. Each of the CLC control card group 160 and the CLC control card group 190 may include one or more CLC control cards. Each CLC control card in the CLC control card group 160 or the CLC control card group 190 may have one or more microprocessing units (e.g. Main Processing Unit (MPU)). For the purpose of illustration, FIG. 1B only shows one MPU for each CLC control card, however it will be readily understood that multiple MPUs can be present in one or more of the CLC control cards.

The photonic switch controller 135 may include one or more CCC control cards. For the purpose of illustration, FIG. 1B shows that the photonic switch controller 135 includes two CCC control cards, the CCC control cards 170 and 180. However, it will be readily understood that further CCC cards may be present. The CCC control card 170 may include one or more MPUs (e.g. MPU 171, MPU 172) and one or more interface communication units (e.g. Internal Communication Unit (ICU)) (e.g. ICU 173). In some embodiments, the interface communication units, such as ICU, can be used for connectivity to SiP cards. Similarly, the CCC control card 180 may include one or more MPUs (e.g. MPU 181, MPU 182) and one or more ICUs (e.g. ICU 183).

Each MPU in the CCC control cards may be communicatively connected to each other. For example, the MPU 171 and the MPU 172 may be communicatively connected to each other. Similarly, the MPU 181 and the MPU 182 may be communicatively connected to each other. Moreover, each MPU in the CCC control cards may be communicatively connected to the ICU. MPUs may be not only connected to the ICU in the same CCC control card but also connected to the ICU in a different CCC control card. For instance, the MPU 171 may be also communicatively connected to the ICU 173 in the CCC control card 170 and the MPU 172 may be communicatively connected to the ICU 183 in the CCC control card 180. Similarly, the MPU 181 may be also communicatively connected to the ICU 173 in the CCC control card 170 and the MPU 182 may be communicatively connected to the ICU 183 in the CCC control card 180. In some embodiments, each of ICU 173 and ICU 183 may handle bandwidth for a portion of all CLCs. A set of ICUs (e.g. ICUs 173 and 183) may cover all the bandwidth (e.g. parallel centralized control).

The ICUs in the CCC control cards may be communicatively connected to the MPUs in the CLC control cards so that the CCC control cards and the CLC control cards can communicate with each other. For instance, the ICU 173 may be communicatively connected to the MPU of each CLC control card in the CLC control card group 160. Similarly, the ICU 183 may be communicatively connected to the MPU of each CLC control card in the CLC control card group 190.

According to embodiments, the CLC control cards (e.g. CLC control cards of CLC control card groups 160 and 190) and the CCC control cards (e.g. CCC control cards 170 and 180) may control or manage connection or connectivity between CLCs and CCCs. The CLC control cards and the CCC control cards may be configured to perform signaling for flow control and policy functions. The CLC control cards and the CCC control cards may also be configured to perform signaling for synchronization of transmission into each fiber. It is noted that synchronization is needed to maintain simultaneous connections between CLCs and CCCs (e.g. SYNC message is always needed). Synchronization is needed whether the lengths of fibers in the switching system are equal to each other or not. All of the (photonic) frames need to arrive at the input of the photonic switch simultaneously. If the lengths of the fibers in the switching system are different from each other, offset calculations may be additionally required.

According to embodiments, the MPUs (e.g. MPUs 171, 172, 181, 182) of CCC control cards may carry control algorithms for bandwidth allocation among the switches (e.g. electronic switches and photonic switches). In embodiments, there may be two modes for bandwidth allocation (e.g. Long Queue First (LQF) and Long Queue First with Starvation Avoidance (LQF/SA)). In some embodiments, the LQF/SA may be suitable for photonic applications.

Detailed bandwidth allocation may be performed by MPUs of the CCC control cards (e.g. MPUs 171, 172, 181, 182) for each CLC in accordance with the control algorithms. The allocated bandwidths (and their respective interfaces) may be communicated to MPU(s) of each CLC chassis. Further detail about the bandwidth allocation will be provided below, for example with reference to FIG. 6A, which includes an example procedural sequence of control signal flow for synchronization, bandwidth allocation, and scheduling between photonic switch interfaces, the photonic switch controller (e.g. CCC controller or CCC control card) and the CLC controller (e.g. electronic switch controller).

Figure 2:
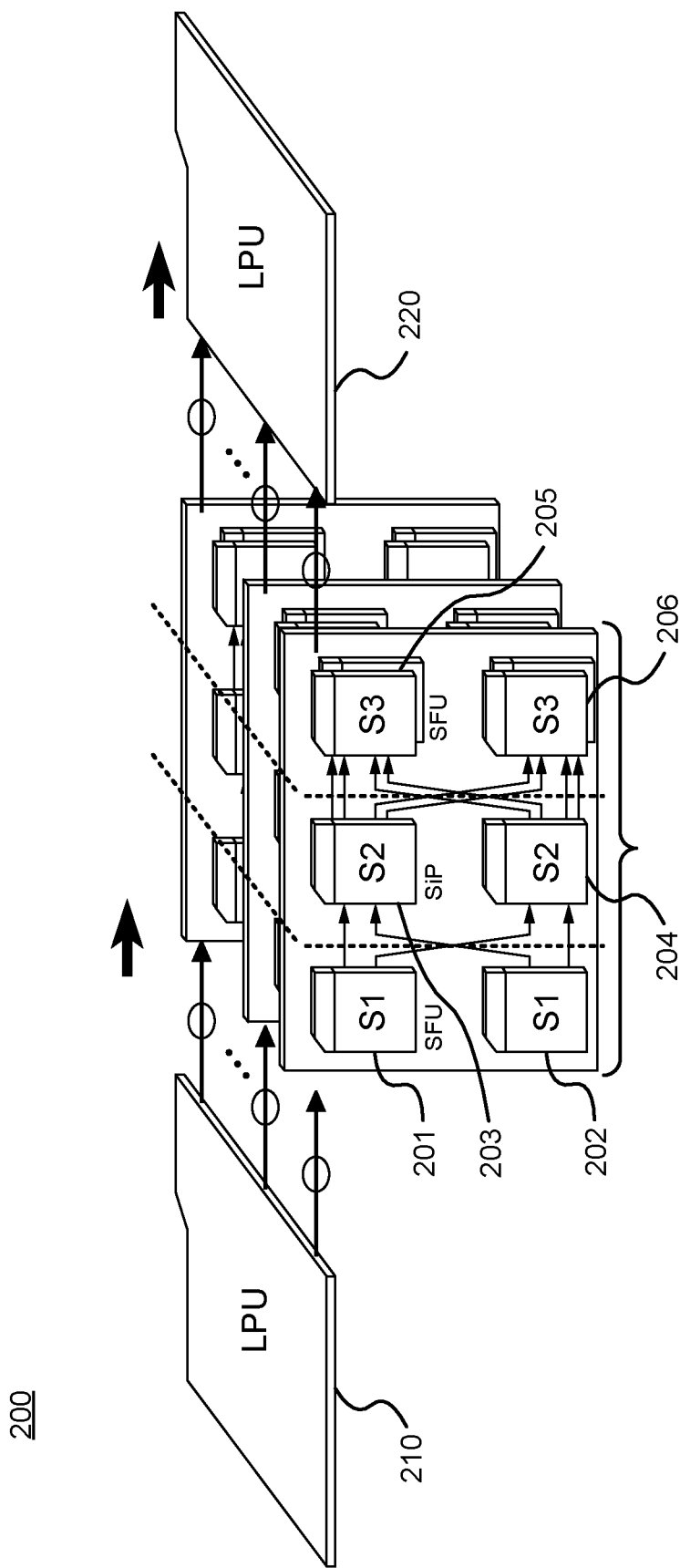
FIG. 2 illustrates unfolded architecture of the scalable data center system using a photonic switch in accordance with embodiments.

FIG. 2 illustrates an unfolded architecture of the scalable data center system using photonic switches in accordance with embodiments. The architecture of FIG. 2 is the unfolded version of the architecture of the scalable data center system illustrated in FIG. 1A and is illustrated from the perspective of the switching system.

Referring to FIG. 2, each of LPU 210 and LPU 220 may interface with switching system/plane 200. The switching system/plane 200 may comprise both electronic switches and photonic switches. The electronic switches may be contained in the CLC and therefore are also part of the CLC, for example the CLC 110 and the CLC 150 in FIG. 1A. The photonic switches may be contained in the CCC and therefore are also part of the CCC, for example the CCC 130 in FIG. 1A.

In some embodiments, the electronic switches may be switches of S1 ($1^{st}$ stage) and S3 ($3^{rd}$ stage). S1 and S3 may represent legacy electronic switch cards deployed within the CLC. Accordingly, S1 and S3 (e.g. the SFUs 201, 202, 205 and 206) may be legacy SFUs designed for solely electronic deployments. However, in the illustrated embodiment the legacy SFUs may have been modified to include functions for interfacing with or operative communication with the photonic switches. According to embodiments, the photonic switches may be photonic switches of S2 ($2^{nd}$ stage). S2 may represent new silicon photonic switches (e.g. SiP switches 203 and 204) contained in the CCC.

It should be noted that the unfolded architecture illustrated in FIG. 2 is just one embodiment and one of ordinary skill in the art should be able to implement other configurations based on this disclosure.

Figure 3:
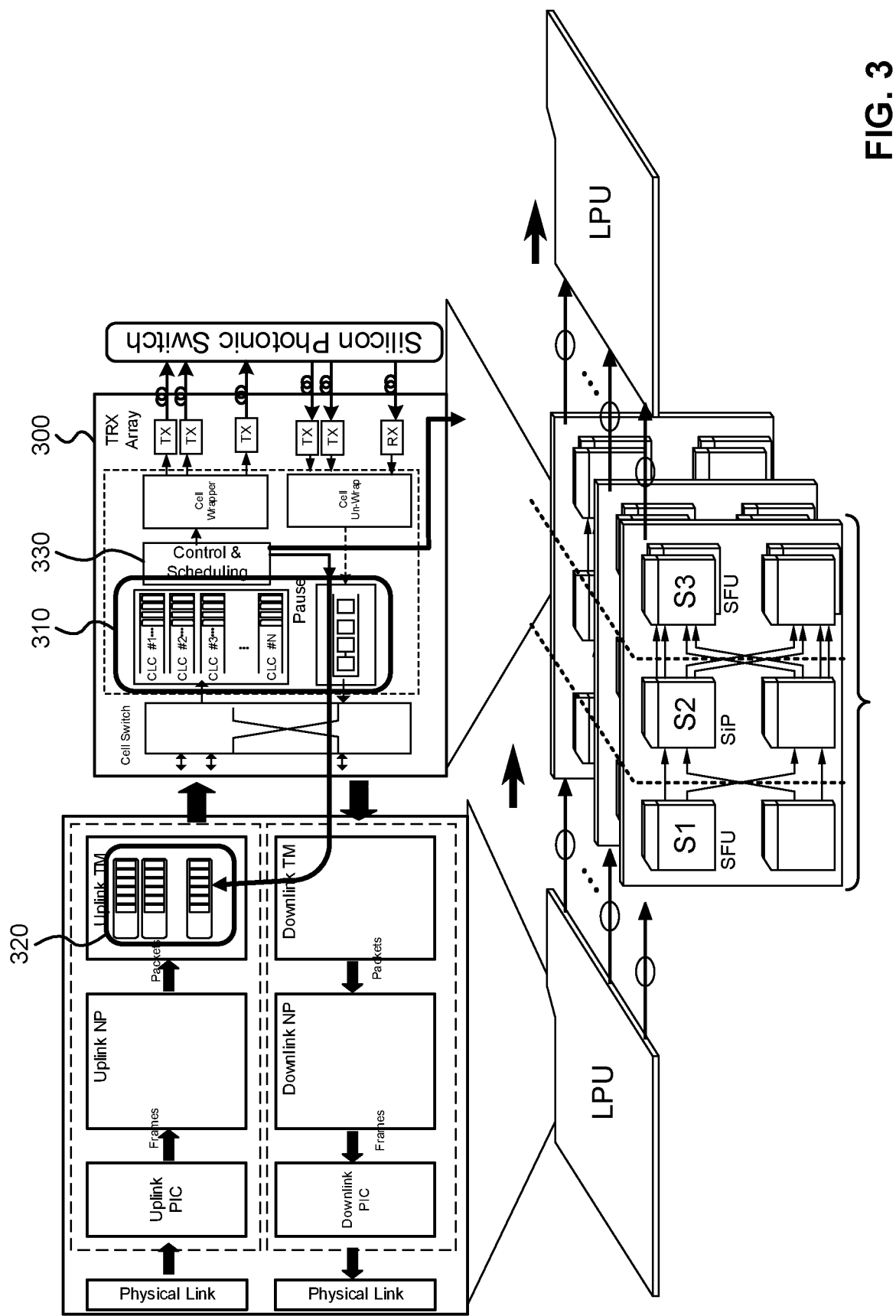
FIG. 3 illustrates implementation of two-tier memories, which comprise queues in the line card and buffers in the switch card, with signalling/message scheme in accordance with embodiments.

FIG. 3 illustrates an implementation of two-tier memories (e.g. queues in the line card (e.g. LPU), buffers in the switch card (e.g. SFU)) and signalling/message scheme in accordance with embodiments. In various embodiments, the two-tier memories may include queues in the line card (e.g. LPU) and buffers in the switch card (e.g. SFU)). The switch card may interface with or be communicatively connected to photonic switches (e.g. silicon photonic switch) in the CCC.

According to embodiments, photonic functions may be integrated into switch card (e.g. SFU 300 representing SFUs of S1 ($1^{st}$ stage) and S3 ($3^{rd}$ stage)) of a chassis. The switch card may have small buffers with capacity to hold packets representative of a few frames of traffic that is to be scheduled through the photonic fabric. Although resources of the switch card (e.g. SFU 300) may have such limited capacity, photonic functions or photonic related functions can be supported by a signalling/message scheme between the two-tier memories. The signalling/message scheme between the line card and the switch card may be supported by existing line cards hence the existing line cards may not need to be replaced or modified.

According to embodiments, the signalling/message scheme may include transmission of a pause signal from the electronic switch card (e.g. SFU) to the line cards. The pause signal may be sent to prevent the line cards (e.g. LPU) from sending data packets, which correspond to a designated time slot, to the electronic switch card earlier than the designated time slot (or the scheduled time) to ensure the amount of data existing in the buffer (e.g. buffer of the (per destination) CLC chassis) does not reach the threshold. The line cards (e.g. LPU) may transmit data packets as long as the buffer (e.g. buffer of the per destination CLC chassis) has not reached the threshold. The pause signal may be put into the (egress) switch buffer to send to the line cards when the buffers of the (per destination CLC) chassis reach a threshold. The pause signal in the switch buffer may be removed when the (per destination) chassis buffers usage goes below the threshold. It should be noted that the signalling/message scheme adopted in embodiments is configured such that the switch card (e.g. SFU) sends a pause signal to the line cards.

According to embodiments, the switch card (e.g. SFU) may be modified to include the buffer set 310. The buffer set 310 may include one or more (per destination) chassis buffers. The buffer set 310 may include on-chip memory of the switch card. As each (per destination) chassis buffer may be designated for each destination CLC chassis, the number of (per destination) chassis buffers may be determined based upon the number of the destination CLC chassis. For example, there may be a maximum of 64 CLC chassis and thus there may be 64 (per destination) chassis buffers in the switch chip (e.g. SFU). In some use cases, the buffers in the switch card (e.g. SFU) may only support one class of buffering. In such cases, the main queue in the line card (e.g. LPU) may have deep queues and handle all priorities. In some embodiments there may be no need for the buffers in the switch card (e.g. SFU) to support per-class queuing (e.g. multi-class support), multicasting or priority handling. In some other use cases, the buffers in the switch card (e.g. SFU) may support per-class queuing (e.g. multi-class support), multicasting or priority handling.

According to embodiments, the line card (e.g. LPU) may include the main queues 320. The main queues 320 in the line card may support per-class queuing (e.g. multi-class support), multicasting and priority handling. As noted above, no changes may be required for existing line cards as the existing line cards may support per-class queuing (e.g. multi-class support), multicasting and priority handling.

According to embodiments, the switch card (e.g. SFU) may be modified to include the electronic switch controller 330. The electronic switch controller 330 may be implemented to control data transmission or data packet flow. In various embodiments, the electronic switch controller 330 in the switch card may be configured to send a pause signal to the one or more line cards through one or more (egress) switch buffers (on-chip buffers) when the (per destination) chassis buffers reach threshold. For example, when the chassis buffer for the destination CLC is filled at 50% of its capacity, the electronic switch controller 330 may place a pause signal into the switch buffer to notify the line cards. In this case, the shortest queue length would be 2 time slots. When packets in the chassis buffer for the destination CLC are released and the chassis buffer usage goes below the threshold (e.g. 50%), then the pause signal in the switch buffer may be removed. As noted above, no changes may be required for existing line cards as the existing line cards may support the pause signalling/message scheme between the switch card and the line cards. The pause signalling/message scheme between the switch card and the line cards include the pause signalling/message scheme from the egress line cards to the ingress line cards, the pause signalling/message scheme between the egress line cards and the switch card, and the pause signalling/message scheme between the switch card and the ingress line cards.

According to embodiments, the bandwidth allocation may be performed by the photonic switch controller (not shown) communicatively connected to the photonic switch 340. The photonic switch controller may allocate bandwidth based upon the buffer report sent by the electronic switch controller 330. The buffer report may include one or more of a pause signalling rate and a capacity of destination chassis buffers. A pause signalling rate is the number of pause signals sent to the line cards over a fixed period of time (e.g. 1 msec, 100 μsec). The pause signalling rate may be used by the photonic switch controller to estimate the length of traffic queue in the line card for efficient allocation of traffic by considering (current) capacity of the traffic queue. The pause signalling rate may be indicative of and proportional to the amount of traffic destined to the destination chassis (e.g. destination CLC). It may be noted that the size of traffic queues in the line card may be unavailable unless the line card is changed. The pause signal can be supported by line cards in a manner that the existing egress line cards send pause signals to the ingress line cards for traffic control. In some embodiments, the pause signal may be transmitted from the electronic switch card (instead of egress line card) to the ingress line card.

FIG. 3 shows, in the dotted rectangle, the new photonic functions 350 on data-path and control-path. In some embodiments, the new photonic functions 350 may be integrated with the cell/packet switch 370. In some embodiments, the new photonic functions 350 may be separate from the cell/packet switch 370. Currently existing transceivers 360 may be used for transmission and receipt of data. The transceivers 360 are connected to photonic switches and therefore are also interfaces to be allocated by the controller.

Figure 4A:
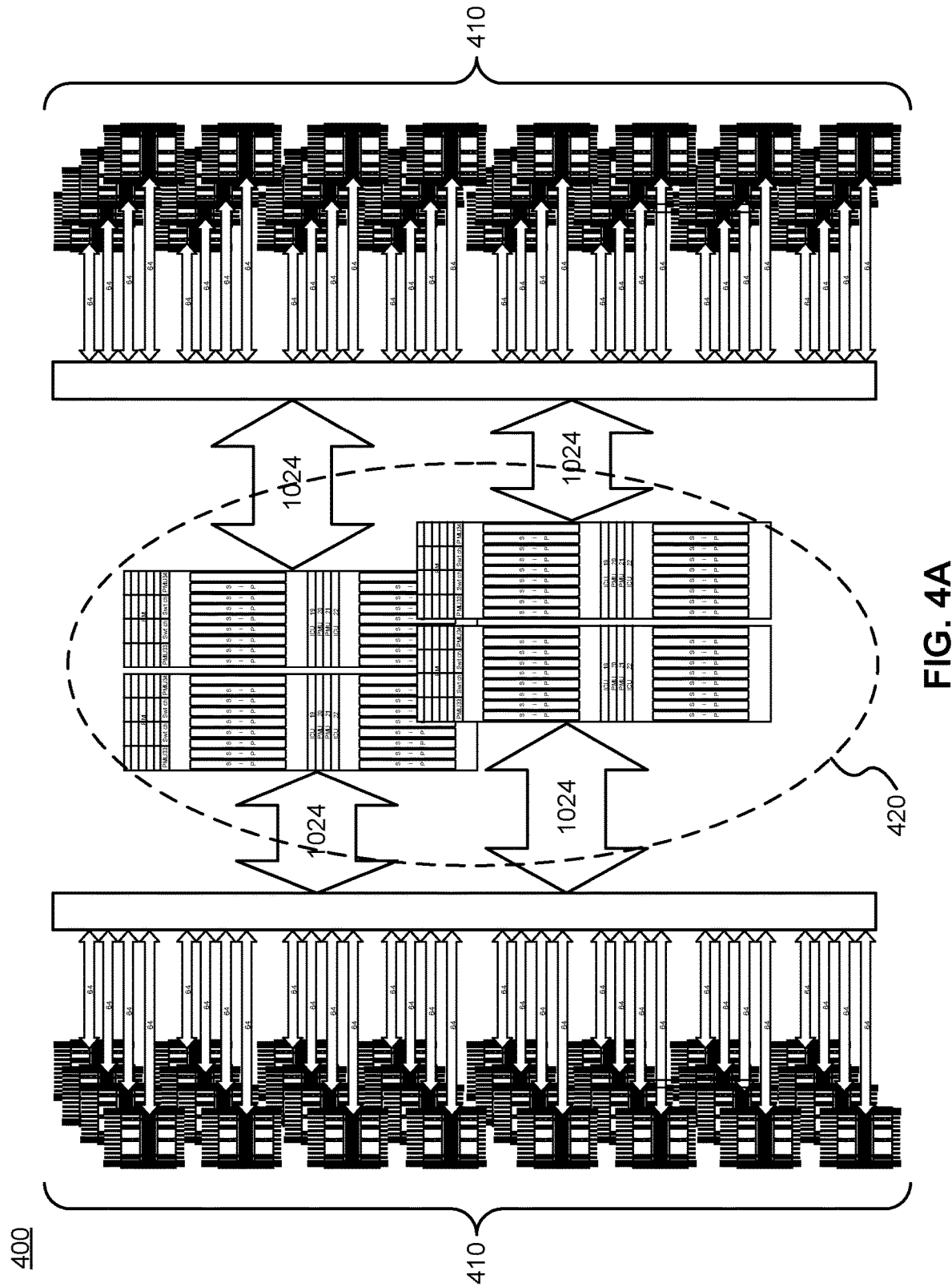
FIG. 4A illustrates a scaled photonic switching system with switching capacity of 4096×4096 fiber capacity, in accordance with embodiments.

FIG. 4A illustrates a scaled photonic switching system with switching capacity of 4096×4096 fiber capacity, in accordance with embodiments. According to embodiments, a photonic switching system with a desired switching capacity may be built using several switches with a smaller switching capacity to achieve the desired switching capacity. The photonic switching system may include M photonic switches with 'N×N' switching capacity. All of these 'N×N' switches may be controlled by a time slot synchronization system (e.g. a time slot synchronous controller, photonic switch controller) that allows photonic cells, packet or frames to arrive at the switch inputs simultaneously, despite diverse fiber length (e.g. 0~100 m). The photonic switching system with M N×N switches may act as one large switch (e.g. switch with large capacity) because of the time slot synchronization system.

Compared to the use of a single large switch (e.g. a switch with large capacity), use of several switches with smaller switching capacity may result in a significantly lower number of waveguide crossings and therefore result in lower insertion loss.

According to embodiments, the photonic switching system may have switching capacity of (M×N)×(M×N). For example, when the photonic switching system include 128 (e.g. M=128) 32×32 switch chips (e.g. N=32), then the matrix of 4096×4096 may be implemented with a time slot synchronization system. In some embodiments, each photonic switch card may contain two 32×32 photonic switch chips. In this case, 64 photonic switch cards may implement the matrix of 4096×4096. In some other embodiments, a photonic switch card may contain more than 2 photonic switch chips. In this case, less than 64 photonic switch cards may be required to implement the matrix of 4096×4096. In other words, 64 photonic switch cards, which can hold more than two 32×32 photonic switches, may be used to implement a photonic switching system with switching capacity larger than 4096×4096.

Referring to FIG. 4A, the switching system 400 may include four CCCs (e.g. CCCs 420) and 64 CLCs (e.g. CLCs 410). According to embodiments, each CCC (e.g. each of the CCCs 420) may contain 16 photonic switch cards and each CLC (e.g. each of the CLCs 410) may contain eight SFU cards. As such, 64 photonic switch cards and 512 SFU cards may be included in the scaled photonic switching system 400. Each of the SFU cards in the CLCs 410 may include two optical flexible card (OFC) plug slots and each OFC plug slot may hold four transceivers. Each SFU may hold eight OFC plugs with new photonic functions and each CLC may hold 64 transceivers. Thus, each CLC (e.g. each CLC of the CLCs 410) may have 64 fibers to communicatively connect to the CCCs (e.g. CCCs 420).

In some embodiments, each of the transceivers may have the transfer rate of 400 Gbps. In this case, each SFU card equipped with ASIC supporting photonic functions and transceivers may have 3.2 Tbps (2×4×400 Gbps) of interconnectivity, and each CLC may have 25.6 Tbps (8×3.2 Tbps) of interconnectivity.

According to embodiments, when 64 CLCs and 4 CCCs are included in the photonic switching system 400, as illustrated in FIG. 4A, a scaled photonic switching system with switching capacity of 4096×4096 fiber capacity can be implemented. In such a case, a total throughput (or total switching capacity) of 3.2 Pbps (800 Gbps×4096) may be achieved if each transceiver runs at 800 Gbps. In other words, the scaled photonic switching system 400 may achieve a total throughput (or total switching capacity) of 3.2 Pbps.

According to embodiments, implementation of photonic functions may require chip resources and on-chip memory. Use of off-chip memory may increase both latency and required board real estate. The on-chip memory uses the pause signalling supported by the current packet line cards (e.g. LPU) with traffic management functions. In addition to photonic framing, the switch application specific integrated circuit (ASIC) provides intra-chassis switching and optical I/O (e.g. 400/800 Gbps SMF) to photonic CCC chassis. The switch ASIC may perform both cell switch functions and photonic functions (e.g. photonic functions on data-path and control-path). The optical interconnects are either co-packaged with ASIC or pluggable for serviceability.

Figure 4B:
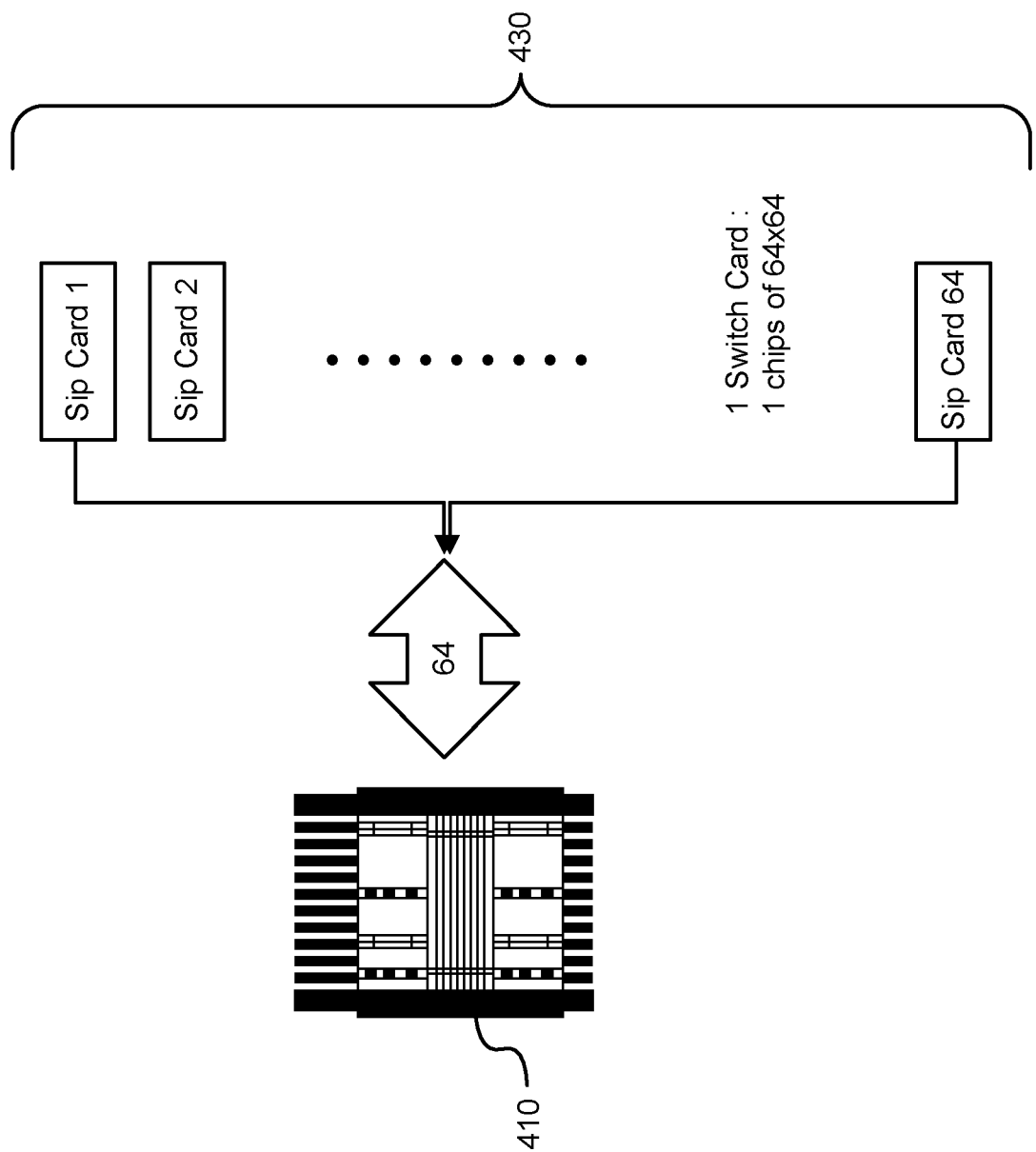
FIG. 4B illustrates connectivity of each CLC to 64 photonic switches in the CCCs, in accordance with embodiments.

FIG. 4B illustrates connectivity of each CLC to 64 photonic switches in the CCCs 420, in accordance with embodiments. As noted above, each CLC (e.g. each CLC of the CLCs 410) may have 64 fibers to communicatively connect to the CCCs (e.g. CCCs 420). As such, each CLC (e.g. each CLC of the CLCs 410) can be communicatively connected to each of 64 photonic switch cards (e.g. SiP cards 430) in the CCCs, as illustrated in FIG. 4B. Each photonic switch card (e.g. SiP card 1, 2, . . . , 64 in FIG. 4B) may include a photonic switch chip with I/O capacity of 64×64.

Figure 4C:
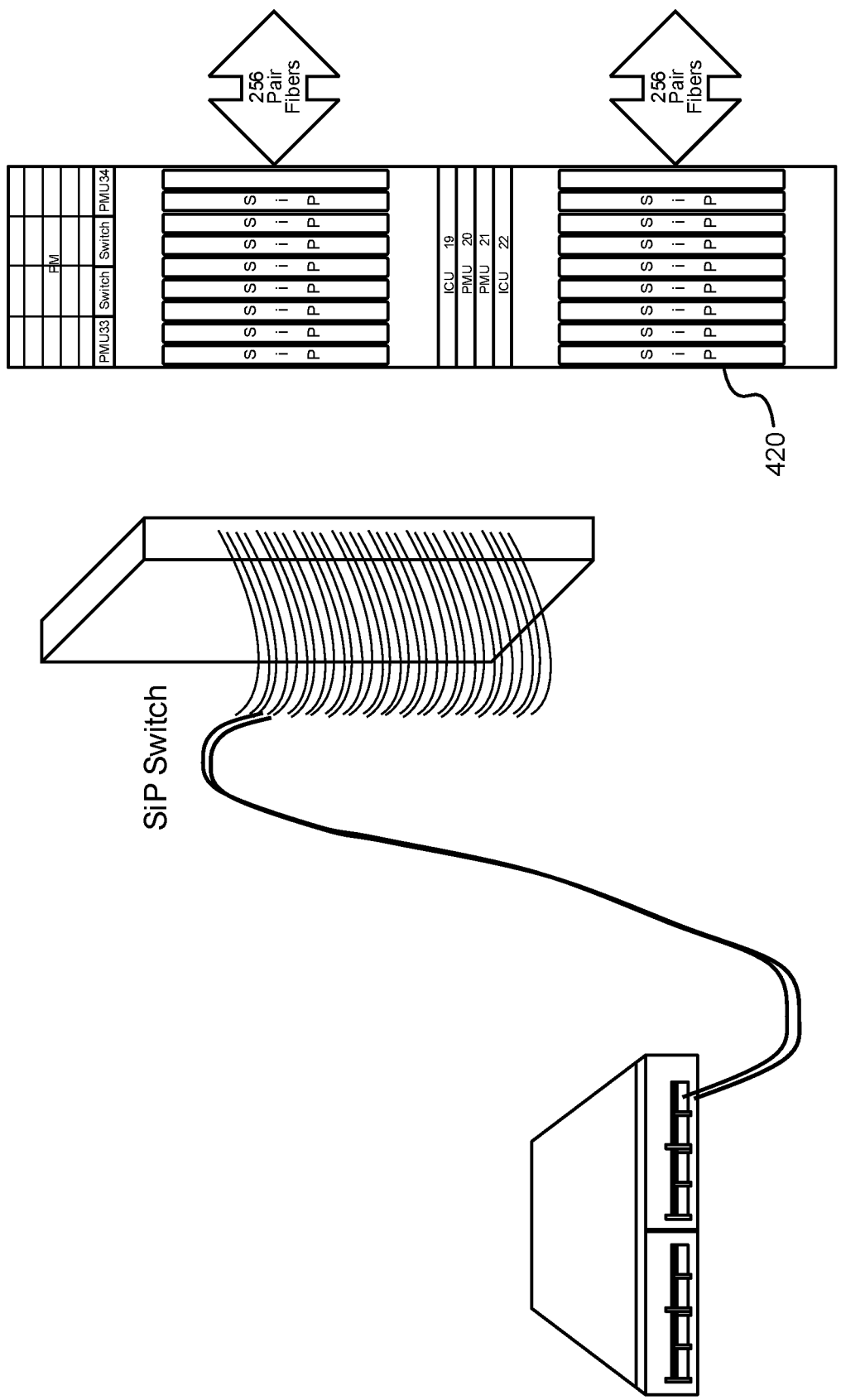
FIG. 4C illustrates an example structure of the CCC containing multiple photonic switch cards in its slots, in accordance with embodiments.

FIG. 4C illustrates an example structure of the CCC containing multiple photonic switch cards in the CCC slots, in accordance with embodiments. According to embodiments, each CCC (e.g. CCC 420) may have 18 slots. However, two slots may be reserved for other uses thus there may be 16 slots available for each CCC, as illustrated in FIG. 4C. Each CCC slot may contain a photonic switch card (e.g. SiP switch card) and each photonic switch card may contain two photonic switch chips. Each photonic switch card may only include drivers and the photonic switch chips but may not have OE/EO (optical electronic/electronic optical conversion), wherein no OE/EO may allow for savings relating one or more of cost, power/cooling and footprint. As there are 16 photonic switch cards in the CCC, each CCC may contain 32 photonic switches. Each CCC slot shown in FIG. 4C may have 32 fibers in and 32 fibers out. However, it should be noted that, in some other embodiments, each CCC slot may have 64 fibers in and 64 fibers out.

Figure 4D:
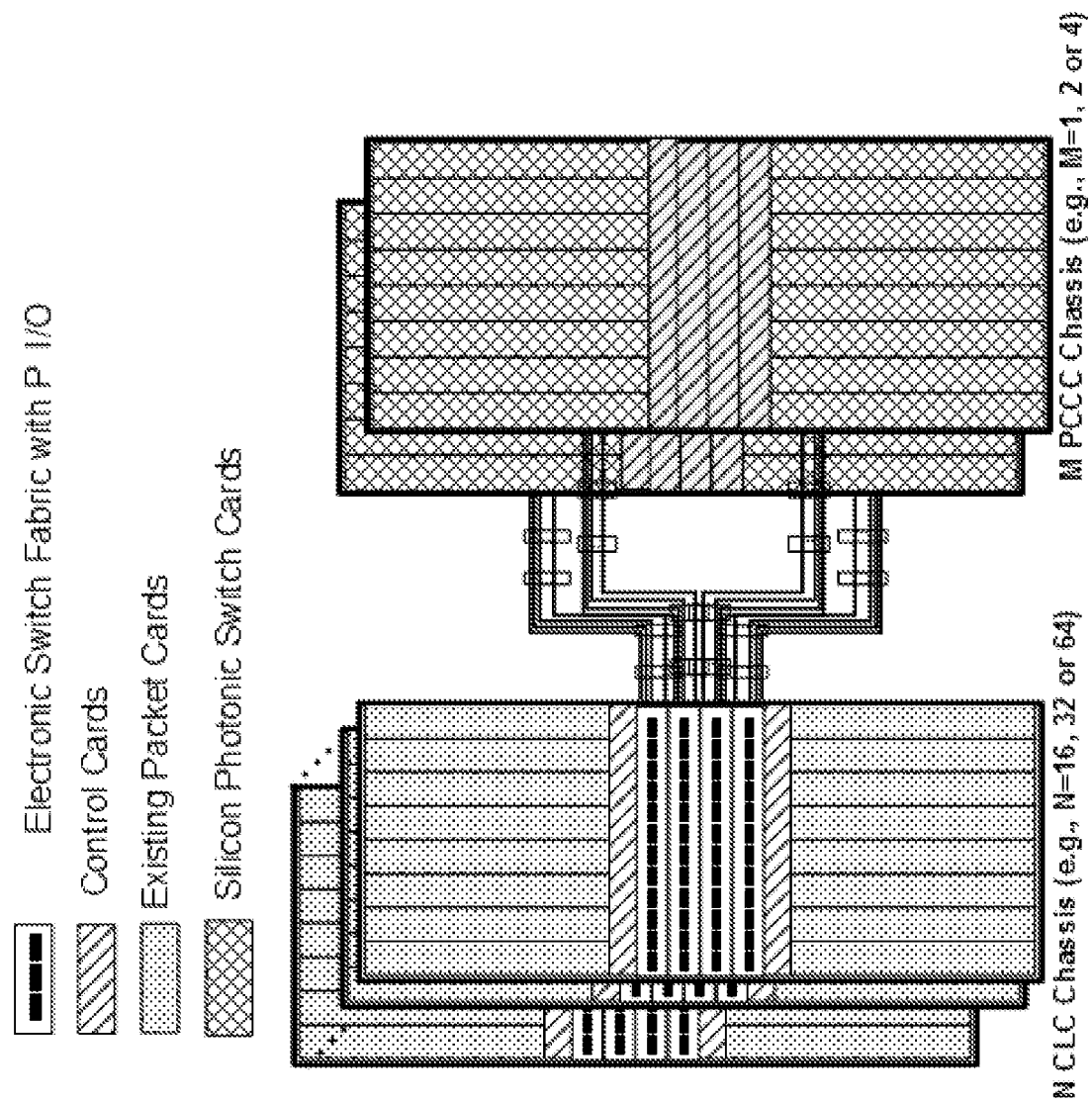
FIG. 4D illustrates connectivity of CLC with (photonic) CCC, in accordance with embodiments.

FIG. 4D illustrates connectivity of a CLC with a (photonic) CCC, in accordance with embodiments. Referring to FIG. 4D, there are N CLC chassis (e.g. N=16, 32 or 64) and M (photonic) CCC chassis (e.g. M=1, 2 or 4). Each photonic CCC chassis may comprise P photonic switch cards with drivers and C control cards. Each photonic switch card may be equipped with at least one N×N (N≥16) silicon photonic switch (e.g. SiP switch) that is connected to all N CLC chassis. The design of the photonic switch can comply with the requirements for fast path finding time during the time slot, low crosstalk and integration with silicon optical amplifier and polarization controller. The switch can operate at 1310 nm to benefit from low cost optics and can be packaged with a single-mode fibre array.

In the scaling architecture, each CLC has S (e.g. S≥M) electronic switch cards. Each electronic switch has P I/Os that are connected to P photonic switch cards in each (photonic) CCC chassis. For example, when S is equal to M (e.g. number of electronic switch cards is equal to the number of CCC chassis), each switch #i of all CLC may connect to (photonic) CCC #i, where i=1, . . . , M.

Figure 5:
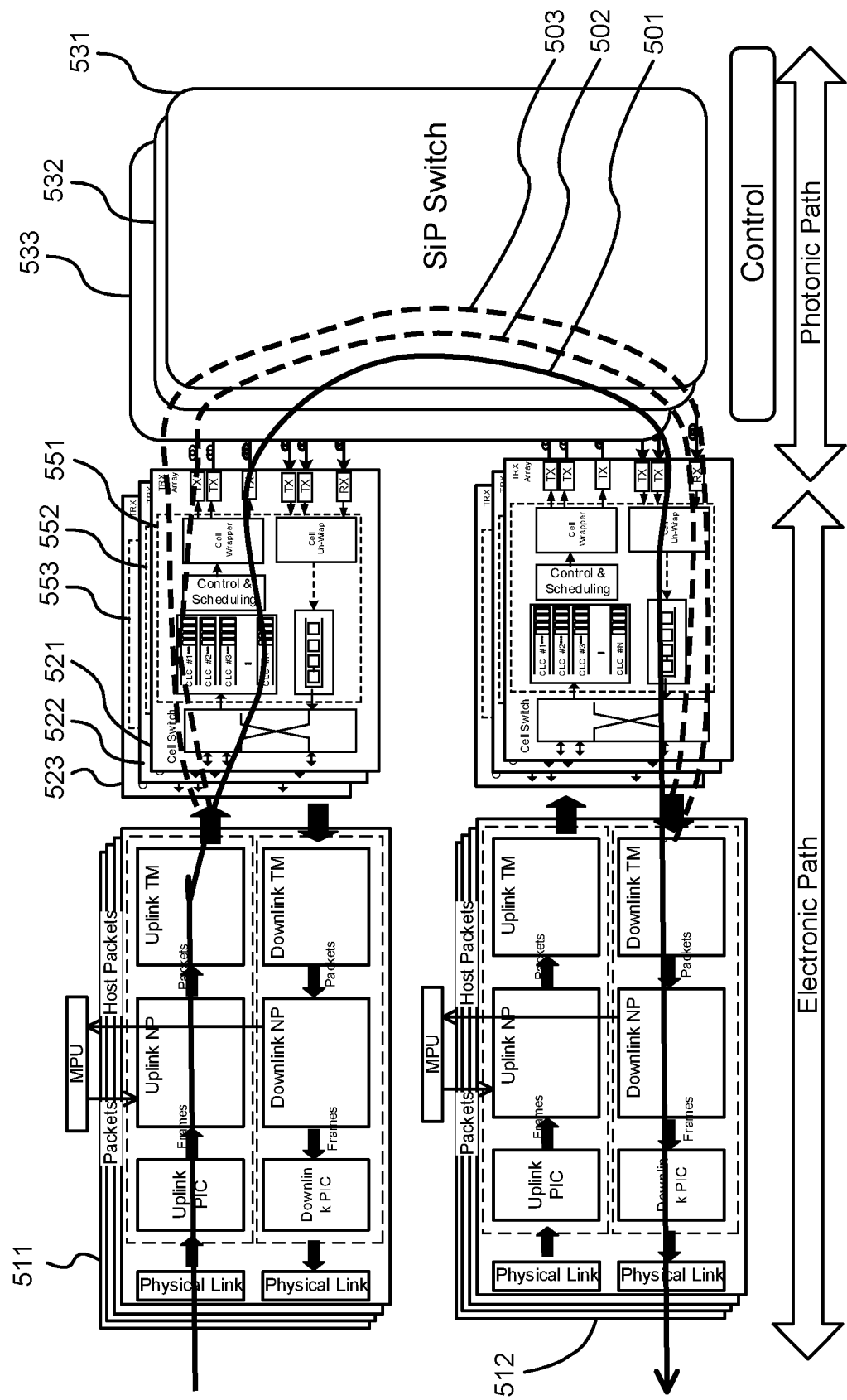
FIG. 5 illustrates a data path for cell or data packet transmission from one CLC to another CLC through both SFU and SiP planes, in accordance with embodiments.

FIG. 5 illustrates a data path for cell or data packet transmission (e.g. packet flow) from one CLC to another CLC through both the switch fabric unit (SFU) and SiP planes, in accordance with embodiments. As noted above, each CLC may include one or more line cards (LPUs) and SFUs. The areas 551, 552 and 553 in SFU planes (e.g. SFU planes 521, 522, 523) are the ASIC chips that provide, photonic functions for data-path such as buffering and photonic framing and functions for control plane which can be described as follows:

On-chip buffering per CLC destination chassis (e.g. N buffers, one per CLC).

Traffic queuing and priorities are handled in the line cards (e.g. LPUs).

Pause/flow control signal to the line cards (e.g. LPUs) when the buffers reach a set threshold.

The pause rate is used to estimate traffic volume to each CLC destination. This can be measured over a window and sent to (photonic) CCC controller for bandwidth allocation.

Upon bandwidth allocation, the photonic frame (e.g. photonic frame illustrated in FIG. 7) is formed by de-queuing packets from the buffers.

According to embodiments, data packets may be disassembled and fragmented into data units at the ingress of the line card (e.g. ingress of LPU 511). Each fragmented data unit (or cell) may be transmitted to the destination line card (e.g. egress of LPU 512) through both SFU planes (e.g. SFU planes 521, 522, 523) and SiP planes (e.g. SiP plane 531, 532, 533). The fragmented data packets may be re-assembled at the egress line card (e.g. egress of LPU 512).

According to embodiments, there may be no inter-plane connectivity between SFU planes. Similarly, there may be no inter-plane connectivity between SiP planes. In embodiments, when there is no inter-plane connectivity between SFU planes (e.g. SFU planes 521, 522, 523) and no inter-plane connectivity between SiP planes (e.g. SiP plane 531, 532, 533), data packets from the line cards in one CLC cannot be transferred to line cards in another CLC without passing through both SFU and SiP planes. For example, the data packet transmission from one CLC to another CLC may be possible only through one of the data paths (e.g. data paths 501, 502, 503) shown in FIG. 5.

Each data path (e.g. data paths 501, 502, 503) can be divided into an electronic path and a photonic path. The path through the line cards (e.g. ingress of LPU 511 to egress LPU 512) and the SFU planes (e.g. SFU planes 521, 522, 523) may be referred to as the electronic path. The path through the SiP planes (e.g. SiP plane 531, 532, 533) may be referred to as the photonic path.

According to embodiments, multiple data packet transmissions may occur simultaneously using multiple data paths. For example, the egress line card 511 may transmit data packets to the ingress LPU 512 through data paths 501, 502 and 503 at the same time, in parallel. In this case, each data packet transmission may be performed by passing through different SFU planes and different SiP planes.

Figure 6A:
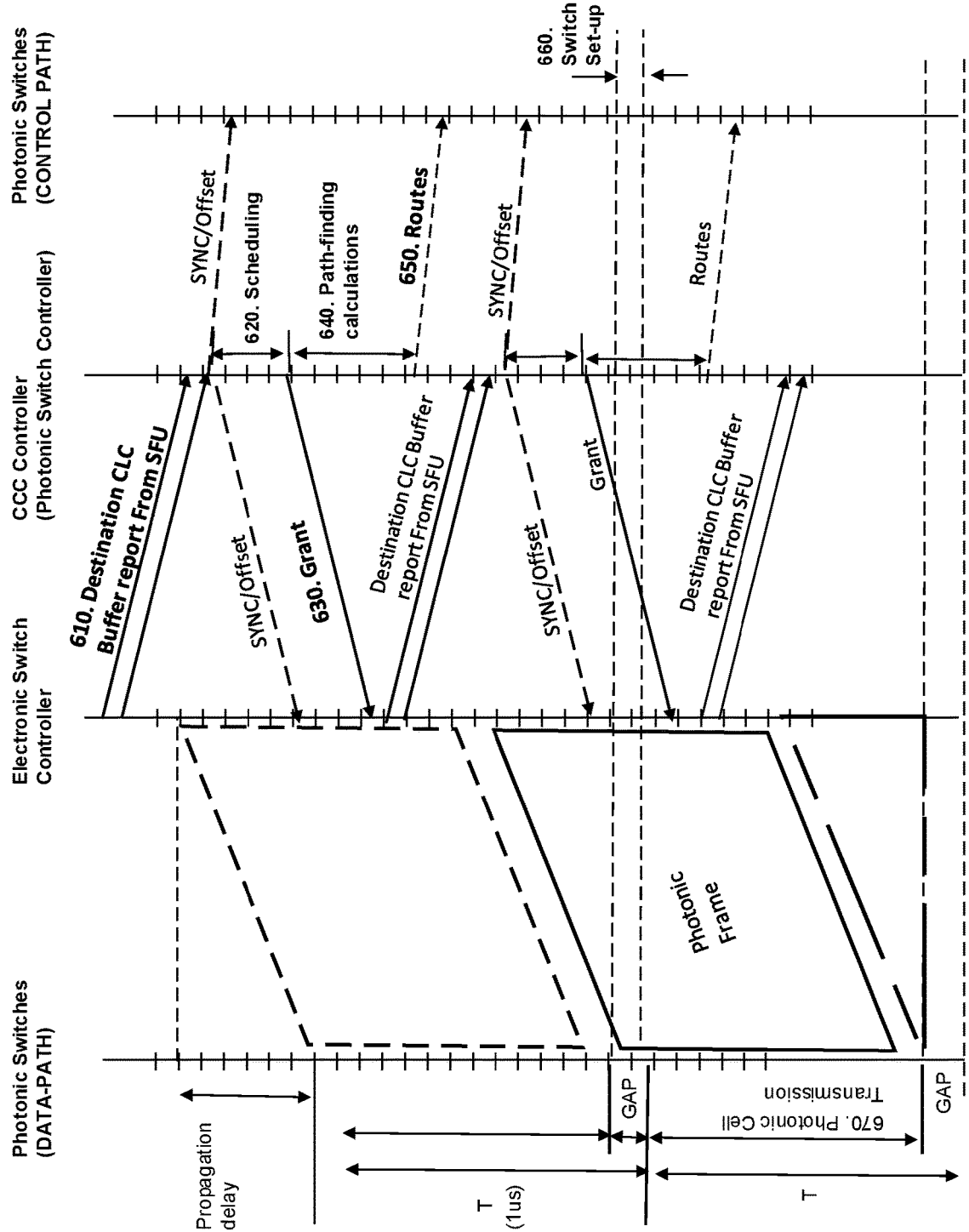
FIG. 6A illustrates an example procedural sequence of control signal flow for synchronization, bandwidth allocation, and scheduling between electronic switch card interfaces, a photonic switch controller and a CLC controller, in accordance with embodiments.

FIG. 6A illustrates an example procedural sequence of control signal flow for synchronization, bandwidth allocation, and scheduling between photonic switch interfaces, photonic switch controller (e.g. CCC control card or CCC controller) and CLC controller (e.g. electronic switch controller), in accordance with embodiments. It is understood that the sequence of control signal flow illustrated in FIG. 6A may be time slot based.

The bandwidth allocation request may be made based on one or more of buffer capacity and the pause signalling rate. The bandwidth allocation request may be sent to the CCC controller. The CCC controller may receive the bandwidth allocation requests from one or more CLC chassis, possibly from all CLC chassis. When the bandwidths and interfaces are allocated, the allocated bandwidths and their respective interfaces may be provided to each CLC chassis.

According to embodiments, communication messages from CLC switch ASIC may be sent to CLC controller through a backplane. For each switch card, the CLC controller has a dedicated optical communication link (e.g. 100 G) to the photonic switch controller (e.g. CCC controller) of the CCC chassis to which the switch is connected. Assuming S=M=C=4, where S is the number of electronic switch cards, M is the number of photonic CCC chassis and C is the CCC controllers (e.g. photonic switch controllers, CCC control cards), the CLC controller has M optical interfaces, one to each (photonic) CCC chassis. For control simplicity, all I/O and communication fibers connected to the (photonic) CCC chassis may have the same length. Control message communications are illustrated in FIG. 6A.

According to embodiments, all controllers in the CCC (e.g. photonic switch controllers, CCC controllers) may handle the bandwidth assignment for electronic switches in all CLC chassis. This means that each controller in a CCC may assign part of chassis bandwidth to CLC chassis. As a result of this parallel assignment and the fact that the number of CLC chassis is small (e.g. 64), a central scheduling scheme may be used by the CCC controllers for bandwidth allocation to CLC switch cards (e.g. electronic switch cards).

At step 610, in every time slot, the CLC controller (e.g. electronic switch controller) may send a buffer report to the photonic switch controller in CCC. The photonic switch controller in CCC (e.g. CCC controller) may receive multiple reports during a time slot. The number of reports received by each photonic switch controller during each time slot may be equal to the number of CLC chassis divided by the number of photonic switch controllers. The buffer report may include the pause signalling rate, buffer-depth or both. The pause signalling rate may indicate how frequently the pause signal is sent to the line cards, for example the number of pause signals sent to the line cards over a fixed period of time (e.g. 1 msec, 100 μsec). The pause signalling rate may be proportional to the traffic transmitted to the destination CLC. The buffer-depth may indicate space availability in a chassis buffer designated for the destination. The buffer-depth may indicate space availability in one or more per destination chassis buffers designated for the destination information in the electronic switch card communicatively connected to the photonic controller. Upon receiving the buffer report, the photonic switch controller in the CCC may perform synchronization among electronic switches and photonic switches. To achieve time slot synchronization among electronic switches and photonic switches, the time and frequency offset between the switches may need to be continually adjusted. In some embodiments, the photonic switch controller may perform the synchronization by sending synchronization or offset control messages (e.g. SYNC/ Offset message), which contain adjusted time and frequency offset values, to the electronic switches and photonic switches. Frame transmission time may be synchronized with nano-second or better accuracy. According to some embodiments, each photonic switch controller (e.g. CCC controller) may synchronize the set of electronic switch cards under its management using a synchronization (SYNC) pulse or Offset message in each time slot. Upon performing synchronization, transmission of the photonic cells may be synchronized regardless of varying delays for transmissions between the line cards and the photonic switches. For example, the transmitting photonic cells may arrive at the inputs of the photonic switch simultaneously, despite of diverse fiber length (e.g. 0~100 m).

At step 620, the photonic switch controller may perform scheduling of the photonic cell transfer between the electronic switches and the photonic switch for one or more time slots.

Upon the scheduling, at step 630, the photonic switch controller (e.g. CCC controller) may send a grant for one or more photonic switch interfaces to the chassis buffer transmitting the photonic cell. The photonic switch controller may use the Longest Queue First with Starvation Avoidance (LQF-SA) scheduling scheme to allocate the fabric interface to the request and issue grants. The grant is given to the electronic switch card for photonic switch interfaces based upon the buffer report receive at step 610. In some embodiments, the CLC controller (e.g. electronic switch controller) may be notified that one or more photonic switch interfaces are allocated to the chassis buffer. The allocated interfaces may provide photonic switch input/output set-up synchronously during the GAP time. The CLC controller may process the grants received from the photonic switch controller (e.g. CCC controller) and de-queue photonic frame(s) for transmission on the assigned interface(s) at the start of next time slot. The photonic switch controller (e.g. CCC controller) may allocate more than one interface to traffic of a given CLC destination in one time slot. In that case, the buffered data may be de-queued and sent to the allocated interfaces in an order that is known to the CLC destination (e.g. ingress line cards), e.g., ascending order of interface number.

Upon scheduling and granting, at step 640, the photonic switch controller may determine a path for the photonic cell transfer between the electronic switches through the photonic switch fabric. The path for the photonic cell transfer may be determined (partly or entirely) based upon the photonic switch interfaces granted to the chassis buffer at step 630. The path finding algorithm may determine connectivity of inputs to outputs through the photonic switch elements and update the new state of the switching elements during the GAP time. The architecture of the switch may play an important role in path-finding time and according to embodiments, it is desirable to comply with O(log N) execution time complexity. For instance, a 16×16 fast photonic switch may be designed and implemented based on the fast photonic switch architecture for interconnect application.

Once the path for the transfer of the photonic cell or frame between electronic switches through the photonic switch is determined, at step 650, the photonic switch controller may notify the photonic switch of the determined path for the photonic cell transfer. In other words, the photonic switch controller may inform the photonic switch which bandwidth(s) and interface(s) are respectively allocated for the photonic cell transfer thereto.

Before the transmission of the photonic cell starts, at step 660, the photonic switch may be re-configured or change the set up for the transmission of the photonic cell between the chassis buffer in the electronic switch cards (e.g. modified SFU) through the photonic switch. The configuration or set up of the photonic switch for the photonic cell transmission may be changed during the GAP time specified in the photonic cell. The configuration or set up of the photonic switch for the photonic cell transmission may be changed in every time slot. In various embodiments, the length of the GAP time may be less than 10 ns.

At step 670, the photonic cell or photonic frame may be transmitted from the one chassis buffer of the electronic switch card (e.g. modified SFU) to another chassis buffer through the photonic switch in the CCC. The photonic cell or photonic frame may include cells or data packets (e.g. substantive data). It is noted that the photonic switch in the CCC may be comparable to circuit switch established in a fraction of a time slot (e.g., nano-second) for duration of one of many time-slots, e.g., micro-seconds.

According to embodiments, the photonic switch may be set up such that the assigned interface is communicatively connected to the output port of the electronic switch card (e.g. modified SFU) and also communicatively connected to the input port of the electronic switch card, during a fixed time period that is assigned for the photonic cell transfer. The length of the assigned time period may be equivalent to the duration of the time slot (e.g. 1 μsec).

According to embodiments, the chassis buffer in the electronic switch card may receive a grant for one or more interfaces of the photonic switch. When the chassis buffer receives the grant for one interface of the photonic switch, it may release or de-queue cells (or data packets) worth (or corresponding to) one or more time slots. When the chassis buffer receives a grant for a plurality of interfaces of the photonic switch, for example 'n' interfaces where n>1, 'n' time slots of cells (or data packets) may be released or de-queued from the chassis buffer. Then, the 'n' time slots of cells may be transmitted to 'n' interfaces of the photonic switch assigned by the photonic switch controller (e.g. CCC control card). Each of the n interfaces of the photonic switch may receive cells (or data packets) worth one time slot (e.g. 1 μsec).

In some embodiments, the receiver (e.g. receiving electronic switch card, receiving SFU) may be notified regarding the (required) order that the cells (or data packets) are to be received via the 'n' interfaces of the photonic switch. In other words, the receiver may be notified regarding which interfaces the cells (or data packets) should be received first. In this type of embodiment, the receiving component may not need to re-order cells (or data packets) received. On the other hand, in other embodiments, the receiver may re-order the cells (or data packets) received. In this case, the receiver may not need to be instructed or notified regarding the order that the cells (or data packets) are required to be received. In some embodiments, the 'n' interfaces can be allocated to only one chassis buffer or queue during one time slot (e.g. 1 μsec), for example when the amount of traffic destined to a certain CLC is greater than other times. As such, the photonic switch controller (e.g. CCC control card) can allocate more capacity (e.g. more interfaces) in that time slot to deal with higher demand. This requires the transmission to those 'n' interfaces to be done in an order known to the receiver (e.g. ascending order of interface number) in order to ensure the data is received in the same order as they were sent.

Figure 6C:
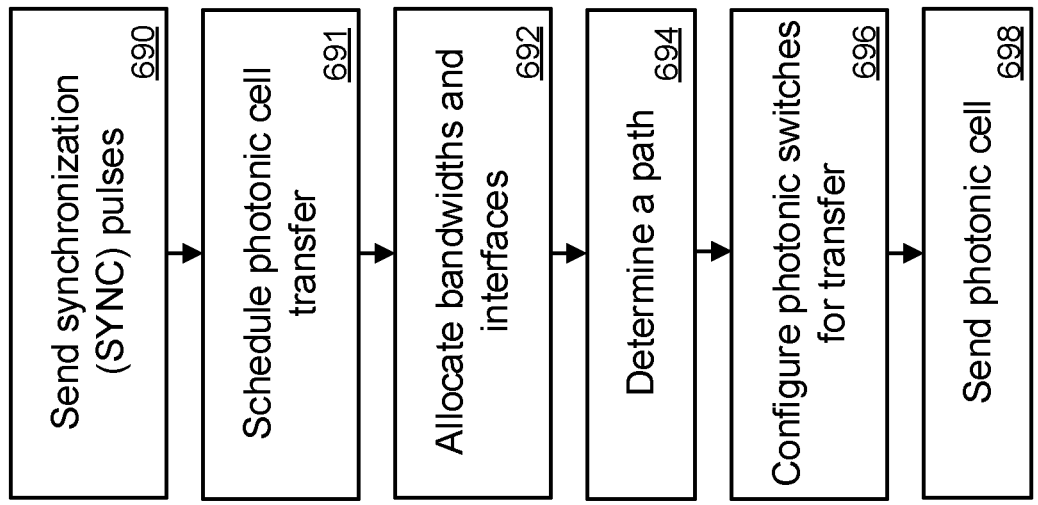
FIG. 6C illustrates a method for photonic cell transfer using one or more electronic switch cards and one or more photonic switches in accordance with embodiments.
Figure 6B:
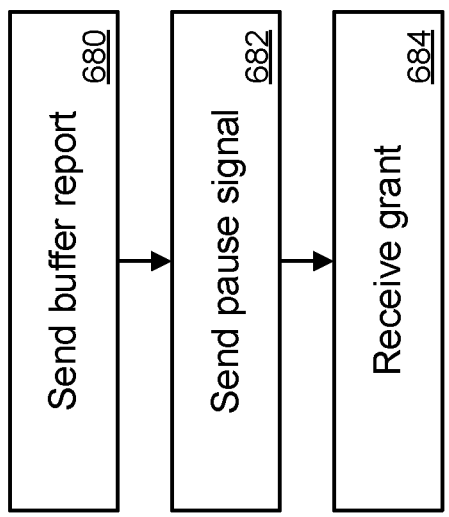
FIG. 6B illustrates a method for controlling photonic cell transfer using one or more electronic switch cards and one or more photonic switches in accordance with embodiments.

FIG. 6B illustrates a method for controlling photonic cell transfer using one or more electronic switch cards and one or more photonic switches in accordance with embodiments. The method includes sending 680 a buffer report including one or more of a pause signalling rate and a buffer-depth. The pause signalling rate indicates a pause signal transmission frequency and the buffer-depth indicates space availability in one or more per destination chassis buffers designated for a destination. The buffer-depth may indicate space availability in one or more per destination chassis buffers designated for a destination information in the electronic switch card communicatively connected to the photonic controller. The method further includes sending 682 a pause signal from the one or more electronic switch cards to the one or more line cards when the one or more per destination chassis buffers reaches a threshold. The one or more line cards are communicatively connected to the one or more electronic switch cards. The method further includes receiving 684 a grant describing how many interfaces (e.g. transceivers) can be used by each of the per destination chassis buffers or queues. The grant may further describe the specific interfaces (or specific port numbers) that each per destination chassis buffer or queue can use for transmitting the traffic to destination CLC through photonic fabric.

FIG. 6C illustrates a method for photonic cell transfer using one or more electronic switch cards and one or more photonic switches in accordance with embodiments. The method includes sending 690 synchronization (SYNC) pulses (e.g. SYNC/Offset message) to destination CLC (e.g. destination CLC controller) in order to indicate the transmission of the photonic cell, packet or frame (e.g. start of the transmission) and the transmission of the grant. The method also includes scheduling 691 the photonic cell transfer for one or more time slots and upon the scheduling, allocating 692 one or more bandwidths and one or more interfaces. The allocating is at least partly based upon one or more of a pause signalling rate and a buffer-depth. The pause signalling rate indicates pause signal transmission frequency and the buffer-depth indicates space availability in one or more per destination chassis buffers designated for a destination. The buffer-depth may indicate space availability in one or more per destination chassis buffers designated for a destination information in the electronic switch card communicatively connected to the photonic controller. The one or more interfaces can be allocated to only one chassis buffer or queue during one time slot (e.g. 1 μsec), for example when the amount of traffic destined to a certain CLC is greater than other times. As such, the photonic switch controller (e.g. CCC control card) can allocate more capacity (e.g. more interfaces) in that time slot to deal with higher demand. This requires increment of the number of interfaces as the transmission to those one or more interfaces needs to ensure the data is received in the same order as they were sent. The method further includes determining 694 a path for the photonic cell transfer and configuring 696 the one or more photonic switches for scheduled transfer of the photonic cell. In addition, the method includes sending 698 the photonic cell to the one or more photonic switches allocated via the one or more interfaces.

Figure 7:
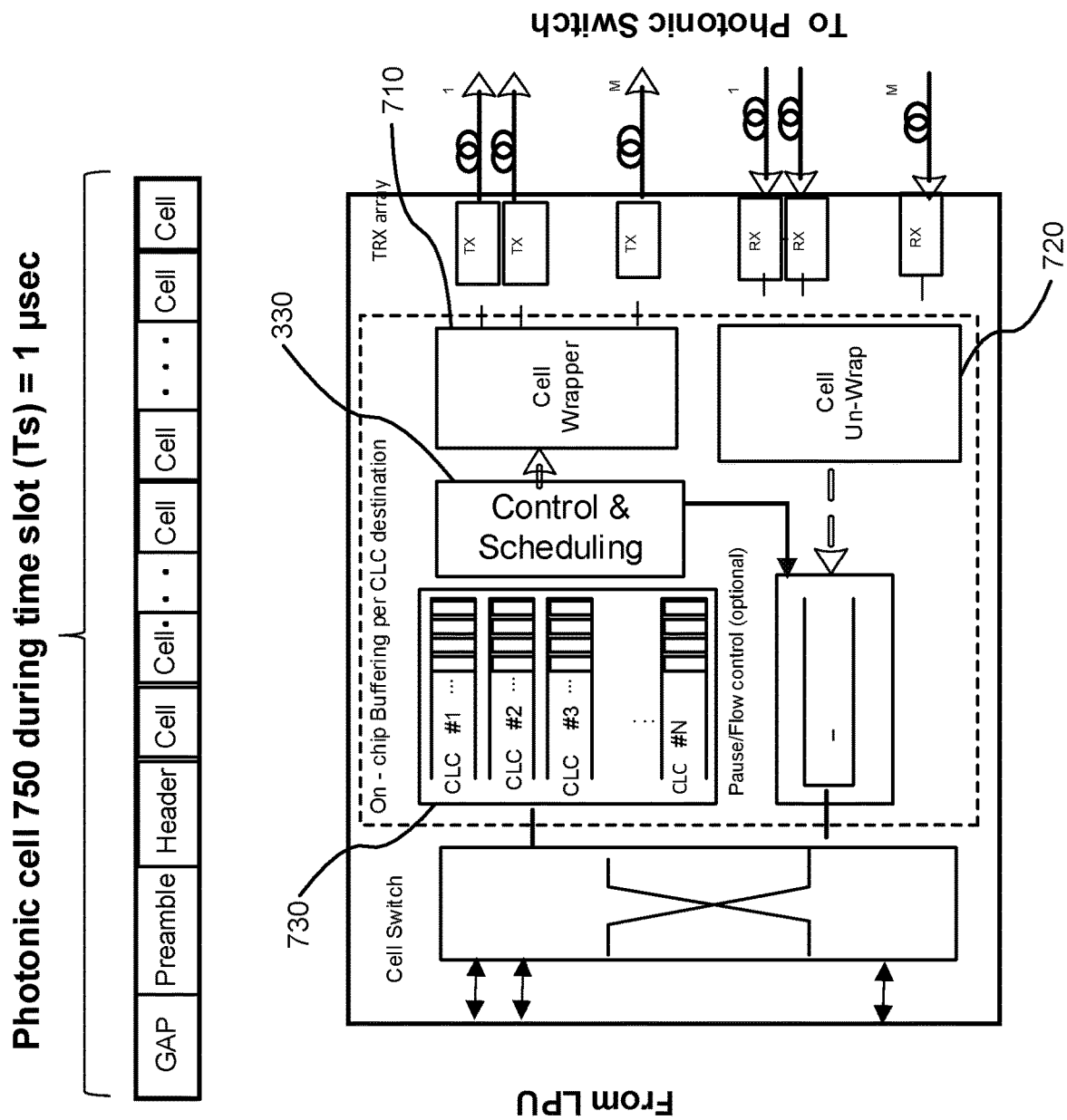
FIG. 7 illustrates photonic cell or photonic frame created by a cell wrapper in the electronic switch card, in accordance with embodiments.

FIG. 7 illustrates photonic cell or photonic frame created by a cell wrapper in the electronic switch card, in accordance with embodiments. According to embodiments, the cell wrapper 710 contained in the electronic switch card 700 (e.g. modified SFU) may create a photonic cell or photonic frame (e.g. photonic frame 750). The cell wrapper 710 may receive the cells or data packets from the (per destination) chassis buffers 730 via the electronic switch controller 330. As noted above, the electronic switch controller 330 may control data transmission or data packet flow. The cell wrapper 710 may receive data packets for a frame when the controller 330 receives a grant from the main controller. The controller 330 may send a pause signal to the line card when a destination CLC meets or exceeds the threshold in order to inform the line card of the queue in the destination CLC.

According to embodiments, the cell wrapper 710 may create a photonic cell or photonic frame (e.g. photonic cell 750) once a photonic switch interface is granted to one of the chassis buffers 730 which transmits photonic cells to the destination. The interface may be allocated by the photonic controller (not shown in FIG. 7). The photonic cells may be transmitted to the destination via the allocated interface by transmitter associated with that interface. In some embodiments, a plurality of photonic switch interfaces may be allocated to the chassis buffer that transmit photonic cells to the destination. In this case, the photonic cell transmission may be performed with low latency during one time-slot.

According to some embodiments, the length of each photonic cell (e.g. photonic cell 750) may be equivalent to a time slot, for example 1 μsec, as illustrated in FIG. 7. The photonic cell may include a GAP, preamble, header and one or more cells.

The GAP may be included in the photonic cell in order to allow the photonic switch to make any necessary configuration adjustments for the photonic cell transmission. In various embodiments, the GAP may be less than 10 ns.

As illustrated above, the setup for the photonic cell transmission between the chassis buffer through the photonic switch may need to be re-configured or to be checked to ensure the photonic cell transmission would be performed appropriately. The configuration or set up of the photonic switch for photonic cell transmission may be performed during the GAP specified in the photonic cell. The GAP may also allow the photonic switch to know when the actual data packets start to be transmitted.

In addition to the GAP, the photonic cell (e.g. photonic cell 750) may also include a preamble, header and one or more cells. The preamble in the photonic cell may include information that allows clock and data recovery (CRD). The preamble may include training data for locking and CRD. Such information may be included due to a change in switch configuration, the light source discontinuation, or both. (As a result, the receiver may need to lock its further operation.) The header in the photonic cell may include information such as source and destination addresses. The cells may be data packets containing substantive data. Each cell may contain only small amounts of data and have fixed length.

Figure 8:
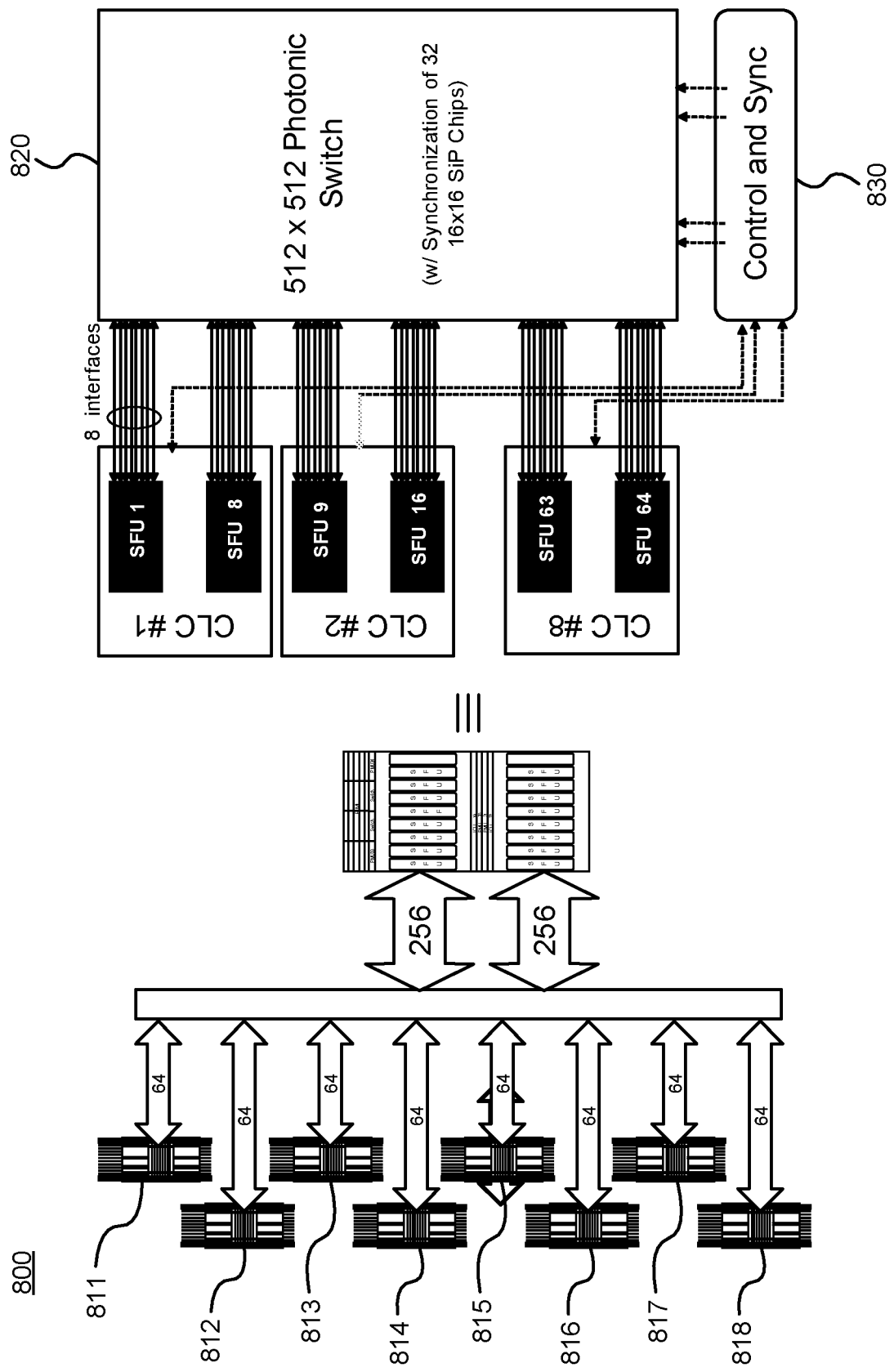
FIG. 8 illustrates a simulation model used to assess the end-to-end performance of a switching system with CLCs and photonic switch chips, in accordance with embodiments.

FIG. 8 illustrates a simulation model used to assess the end-to-end performance (average and maximum delay) of a switching system with CLCs and photonic switch chips, in accordance with embodiments. The simulation model may be implemented as the switching system 800 illustrated in FIG. 8.

The switching system 800 has a single core chassis (e.g. CCC) with 800 Gbps of interconnectivity and eight CLCs (e.g. CLCs 811 to 818). Referring to FIG. 8, each CLC has eight switch cards and each SFU has at least eight interfaces with 400 Gbps or 800 Gbps of interconnectivity. Thus, there are 64 SFUs (e.g. SFUs 1 to 64) and at least 512 fiber interfaces are included in the eight CLCs. The eight CLCs may be communicatively connected to the photonic switch 820. In other words, each of the 64 SFUs may be communicatively connected to the photonic switch 820 through 512 fiber interfaces included in the 64 SFUs.

Actions of the SFUs in each CLC may be controlled by SFU controllers (not shown in FIG. 8). Each CLC contains one or more SFU controllers in order to control data transmission or data packet flow associated with SFUs in the CLC. Each CLC controller (e.g. electronic switch controller) may be communicatively connected to the photonic switch controller 830 (e.g. CCC control card).

Further referring to FIG. 8, the CCC (or single core chassis) includes the photonic switch 820. The photonic switch 820 is a stack of 32 16×16 photonic switch chips (e.g. SiP switch chips). These 32×32 photonic switch chips are synchronized. Specifically, the photonic switch chips may be controlled by a time slot synchronous controller such as the photonic switch controller 830. Due to the synchronization of the photonic switch controller 830, the stack of 32 16×16 photonic switch chips can act as one switch with capacity of 512×512 (i.e. (32×16)×(32×16)), which is the photonic switch 820 in FIG. 8.

For the purpose of (end-to-end) performance assessment, it is assumed that, in every interval, data packets or traffic are assigned to every interface of the SFUs in the CLCs. It is also assumed that the amount of packet loads assigned to each SFU is independent from that of other SFUs when sending traffic to the core photonic switch (e.g. the photonic switch 820). This infers that each SFU may have different packet load regardless of whether they are in the same CLC or in a different CLC. This can be considered a worst case scenario as the load balancer in the line card (e.g. LPU) typically distributes the traffic flows equally across all switch cards (e.g. equally distributes to each SFU in all CLCs).

According to embodiments, the buffer report indicative of the current status of (per destination) the chassis buffers (e.g. space availability in a chassis buffer designated for destination) in the SFUs may be delivered to the photonic switch controller 830.

Available photonic switch capacity may be allocated to electronic switch card interfaces in order to send photonic cells (or photonic frames), which contain cells (or data packets), to the destination CLC. Also, during a given time slot (e.g. one time slot), the electronic switch card (e.g. SFU) interfaces can be allocated to one or more (per destination) chassis buffers. When multiple interfaces are allocated to one chassis buffer in one time slot, the electronic switch card may be notified of the required order that the cells (data packets) are to be received. In other words, the electronic switch card may be notified through which interfaces the cells (or data packets) should be received first. The instructions for receiving order may allow the electronic switch card to ensure sending or receiving photonic frames, hence, data packets in the proper order.

FIGS. 9A to 9D illustrate latency performance of the switching system 800 of FIG. 8, in accordance with embodiments. The latency performance of the switching system 800 is measured and the results are drawn in terms of average and maximum delay. When measuring the latency performance, two types of traffic loadings (or packet loadings) have been used—uniform loading and non-uniform loading.

The uniformity level of the traffic loading may be represented by a factor alpha, where alpha=0 means perfect uniformity and alpha=1 means point-to-point distribution. For example, assuming there are four network nodes, when alpha is zero (i.e. perfect uniformity), every node sends to and receives from all nodes. When alpha is one (i.e. point-to-point distribution), every node sends to only one node and also receives from only one node. When alpha is 0.5, then every node sends to and receives from half of the nodes (e.g. sends to and receives from two nodes).

It is uniform traffic loading when all SFUs have the same amount of traffic load to all destinations. On the other hand, it is non-uniform loading when traffic changes over time, for example in bursty transmissions, and the traffic (e.g. traffic sent from SFUs) may be sent to a selected group of destination.

Figure 9B:
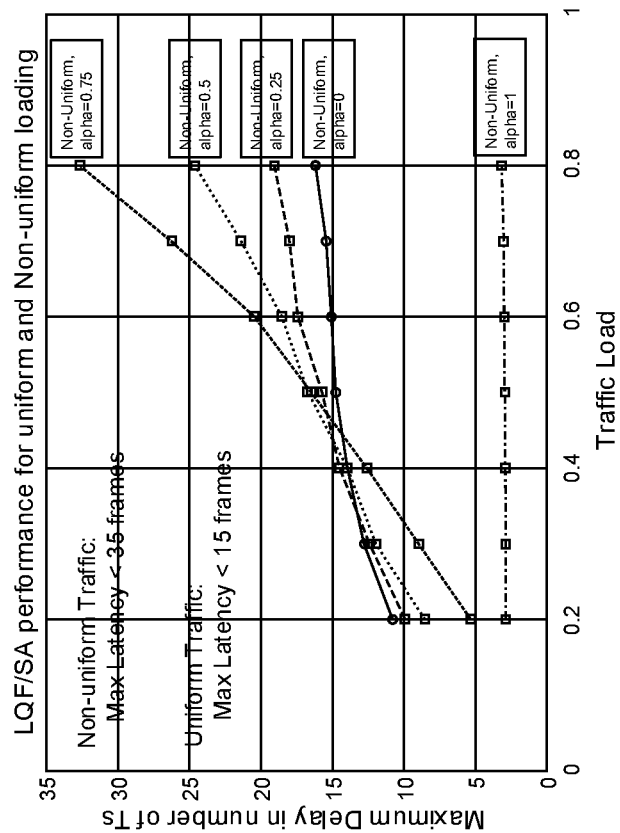
FIGS. 9A to 9D illustrate latency performance of a switching system, in accordance with embodiments.
Figure 9A:
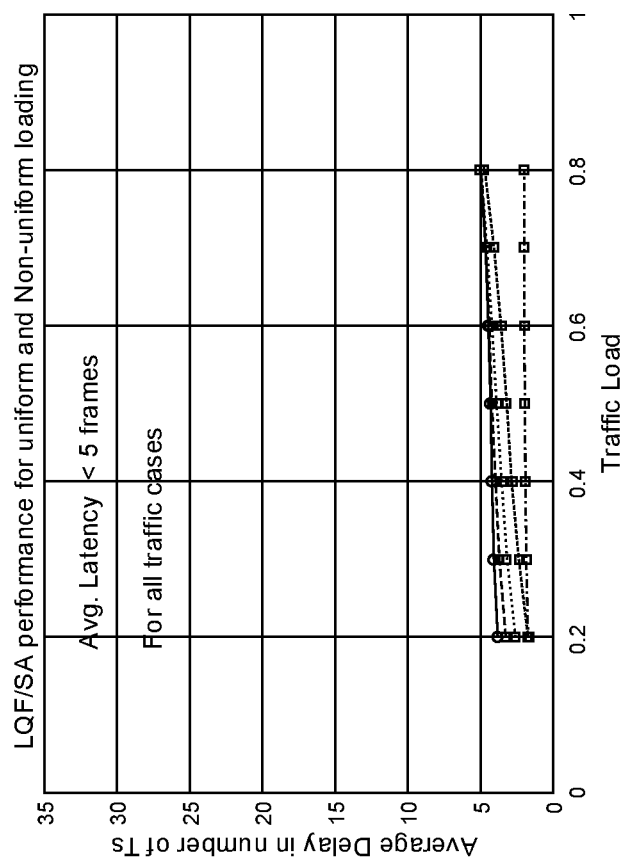

FIGS. 9A and 9B illustrate average and maximum delay for uniform traffic loading and non-uniform traffic loading, respectively, with LQF-SA (Longest Queue First with Starvation Avoidance) scheduling scheme. As illustrated in FIG. 9A, there is not a large difference in latency performance in terms of average delay for both uniform traffic loading and non-uniform traffic loading. Average delay is less than 5 time slots (frames) for all traffic. However, maximum delay for non-uniform traffic loading is generally higher than maximum delay for uniform traffic loading, especially as the non-linearity of the destinations changes over time. As illustrated in FIG. 9B, the maximum delay is less than 35 time slots (frames) for non-uniform traffic loading but the maximum delay is less than 15 time slots (frames) for uniform traffic loading. It has been noted that the latency performance for an on-chip buffer per CLC per class (e.g. two classes of low and high) may be a maximum of 35 time slots without back-pressure (e.g. 250 MB per chip) or 30 MB with backpressure.

Figure 9D:
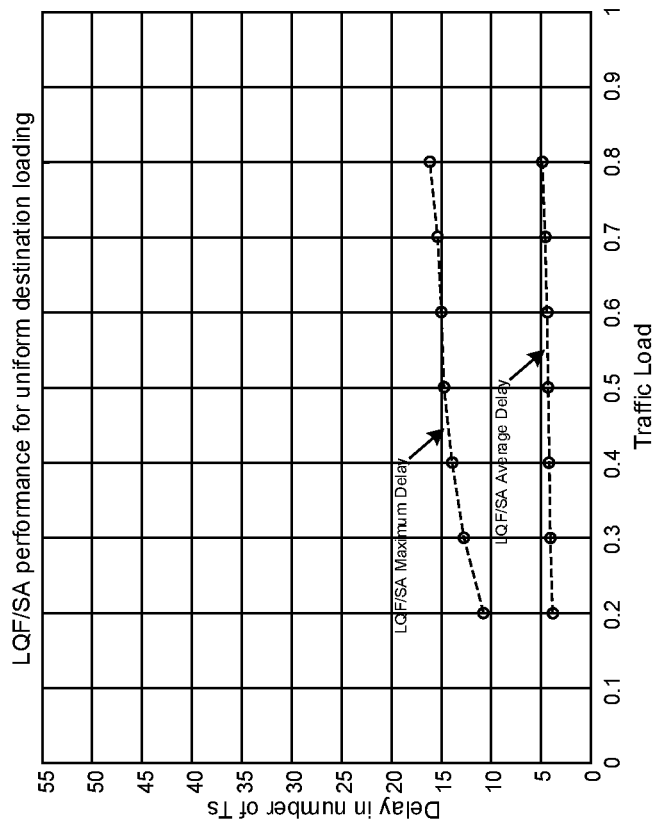
Figure 9C:
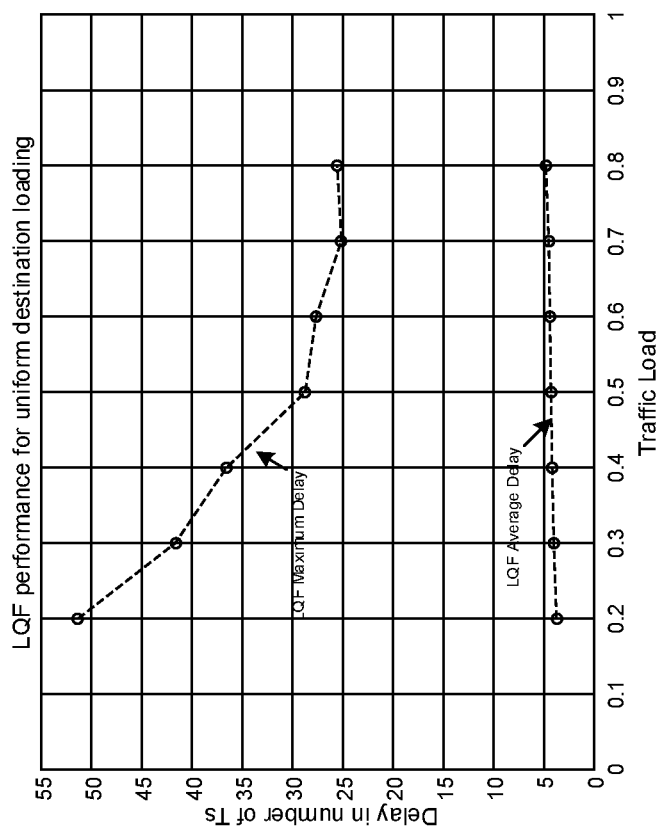

FIGS. 9C and 9D illustrate latency performance for uniform loading with LQF (Longest Queue First) scheduling scheme and LQF-SA scheduling scheme, respectively. As shown in FIGS. 9C and 9D, the LQF-SA scheduling scheme may be more suitable for photonic scheduling. While average delay is similar for both the LQF scheduling scheme and LQF-SA scheduling scheme, maximum delay for the LQF scheduling scheme is generally higher than the maximum delay for LQF-SA scheduling scheme. With the same amount of uniform traffic loading (e.g. uniform destination loading), the maximum delay for LQF scheduling scheme is measured in the approximate range of 25 and 52 time slots, whereas the maximum delay for LQF-SA scheduling scheme is measured in the approximate range of 10 and 17 time slots.

Figure 10:
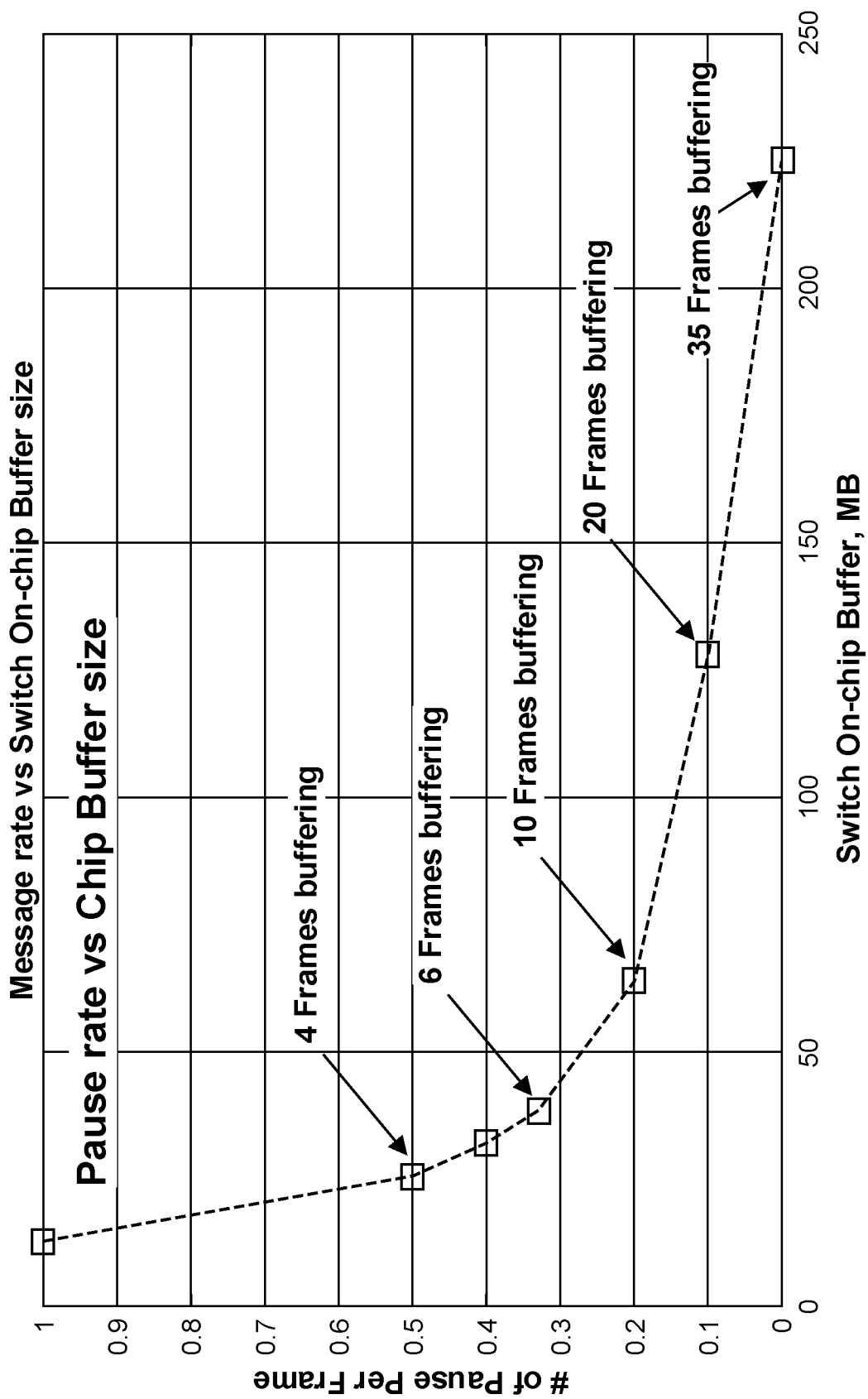
FIG. 10 illustrates the pause messaging rate measured at various on-chip buffer sizes, in accordance with embodiments.

FIG. 10 illustrates the pause messaging rate (e.g. number of pauses per frame) measured at various (switch) on-chip buffer size, in accordance with embodiments. Here, the pause messaging rate (e.g. number of pauses per frame) may be indicative of the traffic for scheduling and bandwidth assignment. For the pause per frame measurement illustrated in FIG. 10, a scaled photonic switching system with a total throughput (or total switching capacity) of 3.2 Pbps is used. The scaled photonic switching system may have 64 CLCs. In this case, a total of 64 buffers are provisioned for each fabric interface ASIC/FPGA.

According to embodiments, the logic of the photonic functions has implementation priority. The remainder of chip resources may be allocated to the buffer. Therefore the pause rate may depend on the size of on-chip buffer. It is noted that in some other embodiments, an off-chip buffer may be possible with SRAM, Hyper RAM or RLDRAM)

According to embodiments, the total on-chip buffer size for each SFU chip can be calculated as 64 chassis×F×800 Gbps=6.4×F MB where F represents size of each buffer and measured in µsec. For example, with 35 frame buffering per CLC, the total buffer size for each SFU chip (with 800 Gbps en-queuing rate) is 224 MB (i.e. 800 Gbps×35 µsec× 64=1.792 Gb=224 MB). If each buffer holds up to 20 frames (e.g. 20 frame buffering) per CLC, the total buffer size for each SFU chip (with 800 Gbps en-queuing rate) is 128 MB (i.e. 800 Gbps×20 µsec×64=1.028 Gb=128 MB). If each buffer holds up to 5 frames (e.g. 5 frame buffering) per CLC, the total on-chip buffer size for each SFU chip (with 800 Gbps en-queuing rate) is 32 MB (i.e. 800 Gbps×5 µsec× 64=256 Mb=32 MB).

According to embodiments, it may be necessary that each buffer holds up to a maximum delay of 35 frames (e.g. 35 µsec with 1 µsec per frame), especially when considering the maximum delay for non-uniform traffic loading illustrated in FIG. 9B. However, in some cases, on-chip buffer size may be much smaller. In such cases, for example when the on-chip buffer holds only 5 frames, a pause/back pressure scheme between SFU and LPU may be used to avoid packet loss as the on-chip buffer size is limited.

It is noted that the pause rate may implicitly estimate the volume of the data to be sent to the destination CLC. The line cards may keep sending to the buffer of that destination unless the line cards receive a pause signal. If no pause signal is received, the traffic to that destination CLC may not be intense. However, when there is high traffic to that destination CLC, a pause signal may be sent (more frequently) and as such the pause rate will increase accordingly.

In some embodiments, bandwidth assignment may use the pause rate as a measure of traffic volume to the destination CLC to allocate capacity to the electronic switch cards. It is noted that sending queue depth to a controller by the line cards may change the assumption of "no change to line card".

Referring to FIG. 10, in the case of 4 frames buffering, a total on-chip buffer size is 25.6 MB (i.e. 800 Gbps×4 µsec×64=204.8 Mb=25.6 MB) and there may be 0.5 of a pause message per frame. In other words, for 4 frames buffering, there may be a pause message for every 2 µsec. Similarly, in the case of 6 frames buffering, the total on-chip buffer size is 38.4 MB (i.e. 800 Gbps×6 µsec×64=307.2 Mb=38.4 MB) and there may be 0.4 of a pause message per frame thus one pause message for every 2.5 µsec. In case of 10 frames buffering, total on-chip buffer size is 64 MB (i.e. 800 Gbps×10 µsec×64=512 Mb=64 MB) and there may be 0.2 of a pause message per frame thus one pause message for every 5 µsec. In case of 20 frames buffering, total on-chip buffer size is 128 MB (i.e. 800 Gbps×20 µsec×64=1.028 Gb=128 MB) and there may be 0.1 of a pause message per frame thus one pause message for every 10 µsec. In case of 35 frames buffering, total on-chip buffer size is 224 MB (i.e. 800 Gbps×35 µsec×64=1.792 Gb=224 MB) and there may be no pause message per frame. With reference to FIG. 9B, if each buffer can hold up to a maximum delay of 35 frames, each buffer is capable of holding an estimated worst case scenario delay (e.g. 35 frames).

Figure 11A:
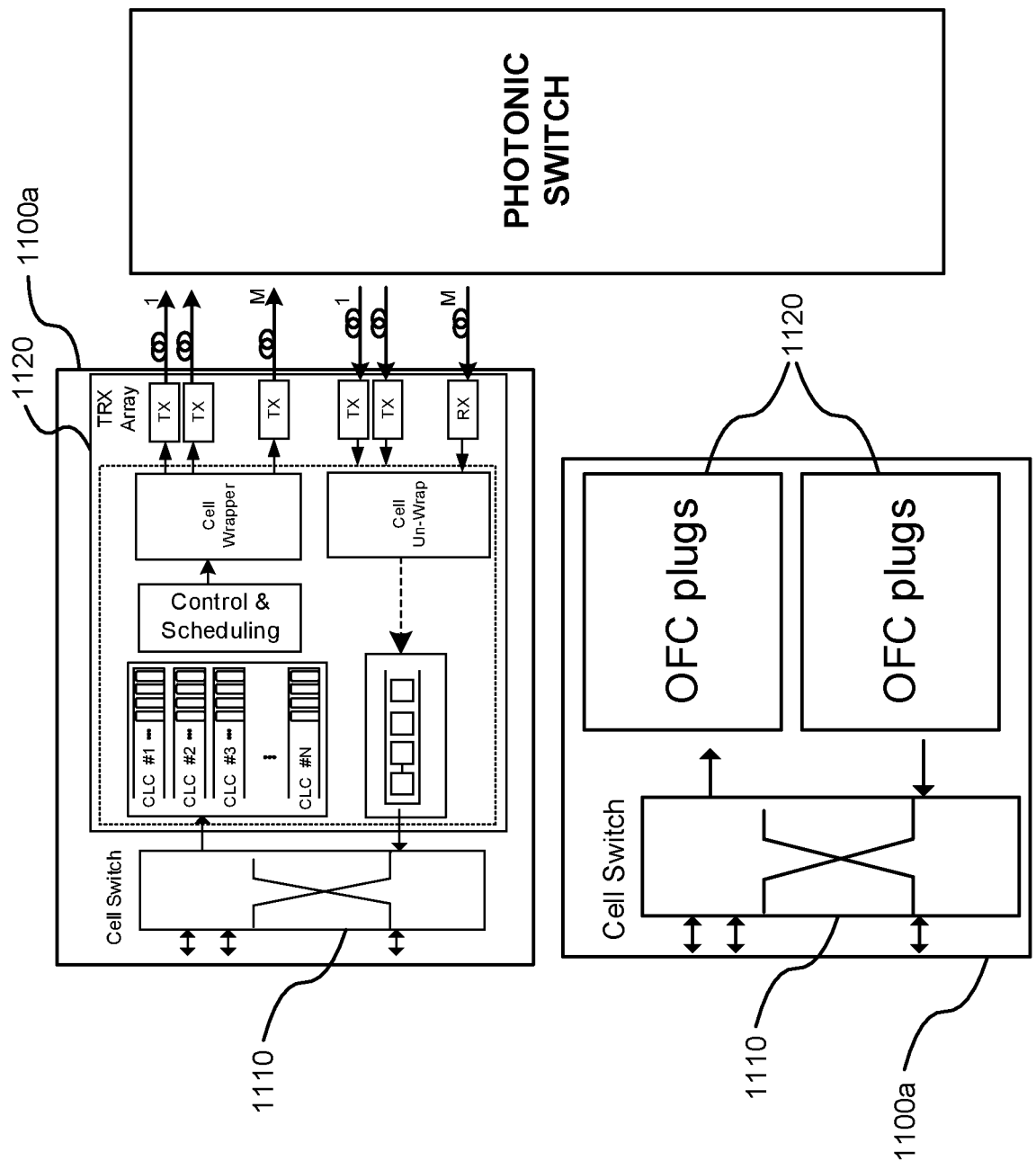
FIGS. 11A and 11B illustrate new photonic functions being transparently embedded into electronic chassis, in accordance with embodiments.
Figure 11B:
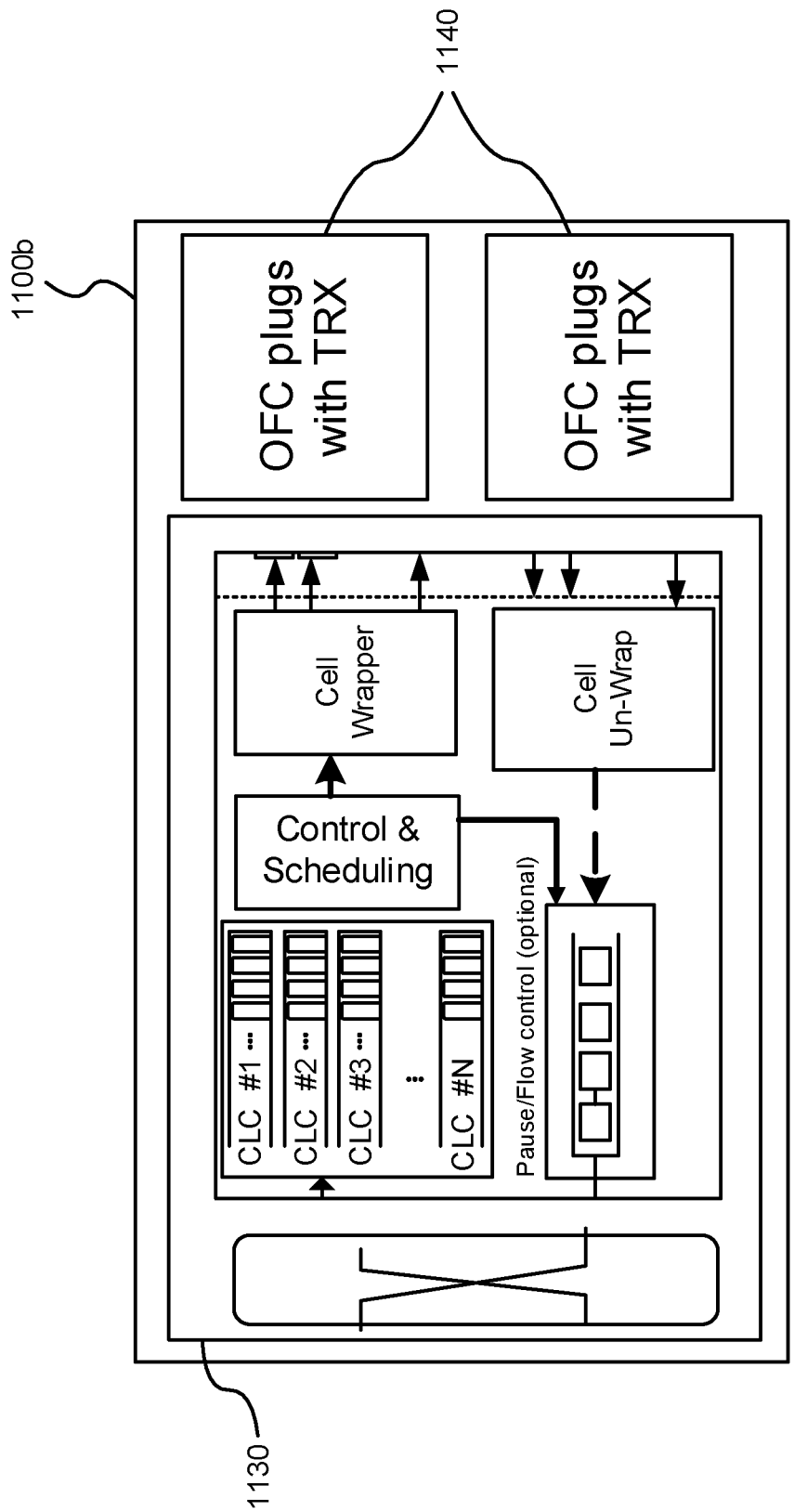

FIGS. 11A and 11B illustrate new photonic functions being transparently embedded into electronic chassis, in accordance with embodiments. The electronic switches illustrated in FIGS. 11A and 11B may be cell-based switches which allow intra-shelf traffic of a CLC. The intra-shelf traffic may be traffic between two LPUs in the same CLC. The electronic switches may support inter-shelf traffic between two LPUs in different CLCs. In case of the inter-shelf traffic, the cells (or data packets) from the source LPU may pass through (per destination) chassis buffer and the cells (or data packets) may be packed into the photonic cell (or photonic frame) by the cell wrapper (e.g. the cell wrapper 710 in FIG. 7). Then, the wrapped photonic cells may pass through the time slot photonic switch fabric.

The per destination chassis buffers may perform on-chip buffering for each CLC destination. The chassis buffer in the electronic switch card may have a capacity for only a few time slots. A deeper queue may not be required for the chassis buffers as there is a main queue with larger capacity in the line card (e.g. LPU). In various embodiments, the main queue in the line card may support per-class queuing (e.g. multi-class support), multicasting and priority handling.

According to embodiments, there may be pause and flow control performed by the electronic switch controller. The electronic switch controller may send the line cards (e.g. LPU) pause signals to prevent the line cards from sending data packets, which correspond to the time slot designated for the data packet transmission, to the electronic switch card earlier than the actual time slot designated (or scheduled time) to ensure the amount of data existing in the buffer (e.g. buffer of the (per destination) CLC chassis) does not reach the threshold. The line cards (e.g. LPU) may transmit data packets as long as the buffer (e.g. buffer of the per destination CLC chassis) has not reached the threshold. According to embodiments, the control signalling (e.g. control-path functions) may be performed by the main controller (e.g. CCC control cards) so that a plurality of switches can act as one switch.

According to embodiments, the new photonic functions may include a cell wrapper for framing cells (or data packets) into the photonic cell and a cell un-wrapper for un-framing the photonic cell. The ASIC/FPGA may be used to wrap cells into the photonic cell on the transmitting side or to unwrap the photonic cells on the receiving side. Wrapping cells or un-wrapping photonic cells may be performed once the time slot is allocated.

FIG. 11A illustrates an embodiment where the existing electronic switch (e.g. electronic switch 1110) in the electronic switch card (e.g. SFU 1100a) is communicatively connected to a new chip containing new photonic functions. Referring to FIG. 11A, new photonic functions may be placed in the OFC plugs 1120 of the electronic switch card or SFU.

In some embodiments, optical flexible card (OFC) plugs may be used. Use of OFC plugs containing new photonic functions may result in significant performance improvement in serviceability, mother-board re-usability and maintenance. For example, currently available SFUs (e.g. SFU 1100) may have two OFC plug slots where each OFC plug slot contains 12×100 Gbps pluggable transceivers. In this case, each SFU (e.g. SFU 1100) may have 2.4 Tbps of interconnectivity. In another configuration, each OFC plug slot of the same SFU may hold four new OFC plugs containing new photonic functions. Thus, each SFU may hold eight OFC plugs with new photonic functions. Each of the new OFC plugs 1120 may house the off-the-shelf transceivers with data rate of 800 Gbps. As such, the SFU with the new OFC plugs containing photonic functions may have 6.4 Tbps (2×4×800 Gbps) of interconnectivity. It is noted that there may be a trade-off between density and serviceability for the use of OFC plugs containing new photonic functions. If not using the OFC plugs for the new photonic functions, then a higher density can be achieved but there may be less flexibility (e.g. lower serviceability).

In some embodiments, new photonic functions may be divided into two or more groups and each group of photonic functions may be placed in the mother board, plugs of the electronic switch card (e.g. OFC plugs 1120), or both. This embodiment may be useful when there is not enough room to place all of the new photonic functions in the existing electronic switch card. How the photonic functions can be grouped and the placement of each photonic function group may be determined based on consideration of chip design efficiency, use of board real-estate, or both.

FIG. 11B illustrates an embodiment where the existing cell switch in the electronic switch card (e.g. SFU 1100b) is modified to include new photonic functions, as such new photonic functions become part of the cell switch. The modified cell switch (e.g. electronic switch 1130) may use OFC plugs containing transceivers (e.g. OFC plugs 1140 with off-the shelf transceivers) so that it can be communicatively connected to the photonic switch.

Some aspects and embodiments may provide several benefits and complement the current electronic packet switching technologies rather than competing therewith. For example, in various embodiments, while the cluster central chassis (CCC) may contain photonic switches, all switches in the CLC may be electronic switches. As such, it is not required to change existing line cards in the cluster line chassis (CLC) of the data center so that financial costs including previous investment can be minimized. Embodiments may require changes on common equipment of the current chassis so that costs can be mitigated. As another example, embodiments allow transparent photonic scaling of existing packet switching systems as photonic functions can be transparently embedded into the current chassis of electronic packet switch and the embedded photonic functions are part of common equipment of the current chassis. Moreover, the transparent embedding of photonic functions does not create an impact on the existing functions.

Additional benefits provided by embodiments may include:

(i) offering higher scalability for the core switches (e.g. photonic switches);

(ii) cost reduction as no transceiver is needed on the core switches (e.g. a large number of transceiver can be eliminated);

(iii) lower power consumption as no transceiver is required and power consumption of photonic switches (e.g. SiP switches) is much lower than that of electronic cell switches; and (iv) smaller foot print as fewer core chassis are required.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. An electronic switch card communicatively interfacing with one or more photonic switches, the electronic switch card comprising:

a cell switch communicatively connected to one or more line cards, wherein each of the one or more line cards includes one or more main queues; and an electronic switch chip integrating one or more photonic functions, the electronic switch chip communicatively coupled to the cell switch and communicatively connected with the one or more photonic switches, wherein the electronic switch chip includes an electronic switch controller configured to send control signals to a photonic switch controller and the one or more line cards.

2. The electronic switch card according to claim 1, wherein the electronic switch chip further includes:
one or more per destination chassis buffers communicatively connected with the electronic switch controller; and
one or more switch buffers communicatively connected with the electronic switch controller.

3. The electronic switch card according to claim 2, wherein the electronic switch controller is configured to send a pause signal to the one or more line cards upon determination that one or more of the one or more per destination chassis buffers and one or more switch buffers meet or exceed a threshold.

4. The electronic switch card of claim 3, wherein the photonic switch controller comprises one or more cluster central chassis (CCC) control cards communicatively connected to each other, the one or more CCC control cards collectively handle one or more bandwidths for the one or more line cards.

5. The electronic switch card of claim 1, wherein the one or more line cards are incapable of interfacing or directly communicating with the one or more photonic switches.

6. The electronic switch card of claim 1, wherein the electronic switch chip further comprises one or more cell wrappers configured to wrap one or more cells or frames in a photonic cell.

7. The electronic switch card of claim 1, wherein the electronic switch chip further comprises one or more cell unwrappers configured to unwrap one or more photonic cells.

8. The electronic switch card of claim 1, wherein the electronic switch controller is further configured to send a buffer report to the photonic switch controller, the buffer report including one or more of a pause signaling rate and a buffer-depth.

9. The electronic switch card according to claim 8, wherein the pause signaling rate is indicative of a frequency of pause signal transmission to the one or more line cards and the buffer-depth is indicative of space availability in the one or more per destination chassis buffers.

10. The electronic switch card according to claim 8, wherein the pause signaling rate is indicative of traffic to one or more destination chasses.

11. The electronic switch card of claim 1, wherein the one or more main queues support per-class queuing, multicasting or priority handling.

12. The electronic switch card of claim 1, wherein the electronic switch chip is integrated into the cell switch.

13. The electronic switch card of claim 12, wherein each of the one or more CCC control cards handles a portion of the one or more bandwidths for the one or more line cards.

14. A cluster central chassis (CCC) controller configured to control one or more photonic switches, the CCC controller comprising:
an interface for receiving data from and transmitting data to one or more electronic switch controllers;
one or more processors; and
a machine readable memory for storing instructions that when executed by the one or more processors cause the CCC controller to be configured to:
receive a buffer report including one or more of a pause signaling rate and a buffer-depth, wherein the pause signaling rate indicates pause signal transmission frequency and the buffer-depth indicates space availability in one or more per destination chassis buffers designated for a destination; and
allocate one or more bandwidths and one or more interfaces at least partly based on the buffer report, to the one or more per destination chassis buffers.

15. A method for controlling photonic cell transfer using one or more electronic switch cards and one or more photonic switches, the method comprising:
sending a buffer report including one or more of a pause signaling rate and a buffer-depth, wherein the pause signaling rate indicates pause signal transmission frequency and the buffer-depth indicates space availability in one or more per destination chassis buffers designated for a destination; and
sending a pause signal from the one or more electronic switch cards to one or more line cards communicatively connected to the one or more electronic switch cards when the one or more per destination chassis buffers reaches a threshold.

16. A method for photonic cell transfer using one or more electronic switch cards and one or more photonic switches, the method comprising:
scheduling the photonic cell transfer for one or more time slots;
upon the scheduling, allocating one or more bandwidths and one or more interfaces, at least partly based upon one or more of a pause signaling rate and a buffer-depth, wherein the pause signaling rate indicates pause signal transmission frequency and the buffer-depth indicates space availability in one or more per destination chassis buffers designated for a destination;
determining a path for the photonic cell transfer;
configuring the one or more photonic switches for scheduled transfer of the photonic cell; and
sending the photonic cell to the one or more photonic switches allocated via the one or more interfaces.

17. The method of claim 16, wherein the photonic cell is sent to the one or more photonic switches via two or more interfaces.

18. The method of claim 16, wherein the photonic cell is sent to the one or more photonic switches in an order known to the destination.

19. The method of claim 18, wherein the order known to the destination is based on interface number of the one or more interfaces.

* * * * *